(12) United States Patent
MacGregor et al.

(10) Patent No.: US 11,378,962 B2
(45) Date of Patent: Jul. 5, 2022

(54) SYSTEM AND METHOD FOR EFFECTING A SAFETY STOP RELEASE IN AN AUTONOMOUS VEHICLE

(71) Applicant: Zoox, Inc., Foster City, CA (US)

(72) Inventors: Collin MacGregor, Foster City, CA (US); Sy Kelly Olson, Oakland, CA (US); Jefferson Bradfield Packer, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 198 days.

(21) Appl. No.: 16/518,897

(22) Filed: Jul. 22, 2019

(65) Prior Publication Data

US 2021/0026359 A1 Jan. 28, 2021

(51) Int. Cl.
*G05D 1/02* (2020.01)
*G05D 1/00* (2006.01)
*H04L 67/12* (2022.01)

(52) U.S. Cl.
CPC ......... *G05D 1/0214* (2013.01); *G05D 1/0088* (2013.01); *G05D 1/0285* (2013.01); *G05D 2201/0213* (2013.01); *H04L 67/12* (2013.01)

(58) Field of Classification Search
CPC .. G05D 1/0214; G05D 1/0088; G05D 1/0285; G05D 2201/0213; H04L 67/12
See application file for complete search history.

(56) References Cited

U.S. PATENT DOCUMENTS

| 8,706,394 B2 | 4/2014 | Trepagnier et al. |
| 10,086,782 B1 * | 10/2018 | Konrardy ............... G08G 1/017 |
| 2017/0153644 A1 | 6/2017 | Otsuka et al. |
| 2019/0056735 A1 * | 2/2019 | Koopman ............ G05D 1/0077 |

FOREIGN PATENT DOCUMENTS

EP 3178715 A1 6/2017

OTHER PUBLICATIONS

International Search Report and Written Opinion dated Sep. 10, 2020, Patent Application No. PCT/US2020/043129, 8 pages.

* cited by examiner

*Primary Examiner* — Nicholas Kiswanto
(74) *Attorney, Agent, or Firm* — Davis Wright Tremaine LLP

(57) ABSTRACT

A method and apparatus for selecting among a plurality of trajectories comprises receiving at least a first and second trajectory, each having an associated level in a trajectory hierarchy, determining whether the first trajectory is viable, determining a present level limit for trajectory selection, and if the first trajectory is viable and its level does not exceed the present level limit, executing the first trajectory. If the first trajectory is not viable or the associated level of the first trajectory exceeds the present level limit, the second trajectory is executed if it is viable and its associated level does not exceed the present level limit. A state variable is set such that when a trajectory lower in a trajectory hierarchy is executed, a trajectory selector waits for a message from a monitor or an operator before returning to the use of higher level trajectories.

20 Claims, 8 Drawing Sheets

SYSTEM AND METHOD FOR EFFECTING A
SAFETY STOP RELEASE IN AN
AUTONOMOUS VEHICLE

BACKGROUND

Systems, such as autonomous vehicles, are programmed with safety in mind, in addition to other goals, such as predictability, responsiveness, and, in the case of autonomous vehicles, passenger comfort. In certain situations, such as where an object intersects a trajectory of such an autonomous vehicle, where a sensor of the system fails to operate, etc., the system may be programmed to operate in a mode other than in a nominal mode to ensure safety. In such instances, returning to the nominal operating mode from that other mode may not be safe.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
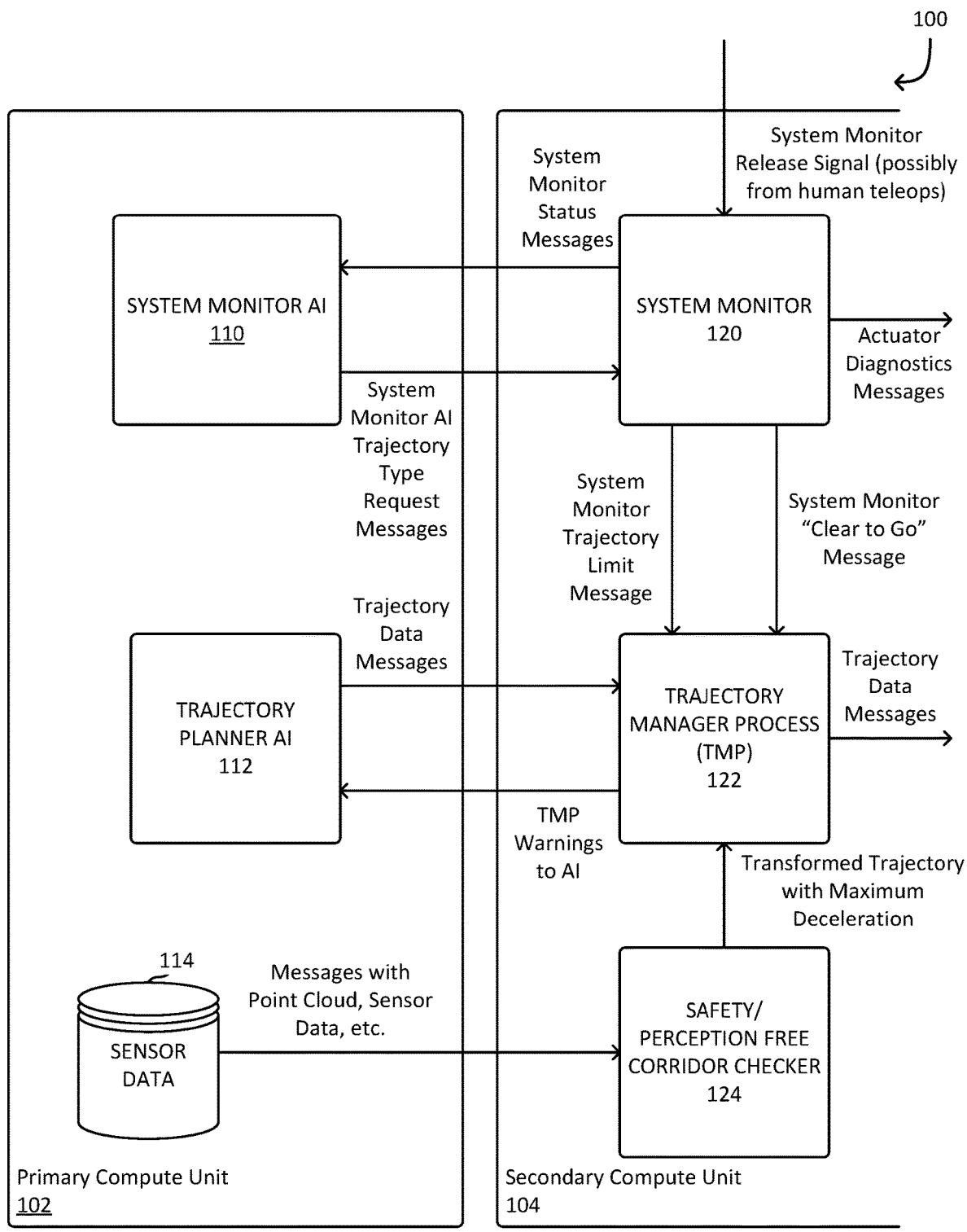
FIG. 1 is a high-level block diagram illustrating examples of some elements of an autonomous vehicle management and/or control system, including a primary computing system and a secondary computing system.

This disclosure describes methods, apparatuses, and systems for implementing a safety stop release in an autonomous vehicle. In an example, an artificial intelligence ("AI") unit considers inputs and outputs a selection of possible trajectories to a trajectory manager process ("TMP") that can operate as system to perform collision avoidance that selects one of the provided trajectories using particular criteria. In this example, the TMP might then output the selected trajectory to a drive manager that controls, possibly among other systems, the propulsion systems of the vehicle.

In one example, the TMP performs criteria checks on the provided trajectories, independent of what trajectories the AI outputs so that even if the AI system outputs an unsafe trajectory, the TMP will not send the corresponding signals to the drive manager process or drive actuators. In some instances, the TMP might output a trajectory to bring the vehicle to a stop if none of the proffered trajectories meet the TMP's criteria. In a specific example, the TMP evaluates the trajectories for punctuality, consistency, feasibility, and collision checking. A viable trajectory is one that at least meets these validity tests, but those might not be sufficient requirements.

The punctuality requirement relates to how much time has passed since the trajectory was received. For example, if a TMP is in the process of executing a trajectory or it is being executed by another system and the TMP receives a next trajectory to be executed, but that next trajectory was received more than four seconds ago, that might be considered a failure of the punctuality criteria. This might occur where there is some delay in communications of the trajectory.

The consistency criteria might relate to precluding large jumps in vehicle state or command from an immediately prior trajectory to a present trajectory, based on some predetermined consistency constraints. For example, if the speeds of the immediately prior trajectory and a present trajectory are too dissimilar, the present trajectory might be flagged as lacking consistency.

The feasibility criteria might relate to verifying that the trajectory being validated is within the current dynamic capabilities of the vehicle (e.g., "a new trajectory that commands a velocity of 180 KPH or a lateral acceleration of 6 m/s/s shall not be followed."). A trajectory might be deemed not feasible if it, for example, was generated too far in the past and is thus stale. In some instances, new trajectories are provided each period of a timing clock, which might be every tenth of a second or every hundredth of a second. As used herein, "frame" refers to a period in which a trajectory is considered and the length of time represented by a frame might vary. A trajectory might be timely received, such as just before a frame's time period starts, but might have been computed much earlier, making it stale.

The collision checking criteria might be that the TMP rejects trajectories that it determines would contain imminent collisions with agents or objects. In some instances, a trajectory has a separate validity criteria that covers the punctuality, consistency, and feasibility and has a collision-free requirement. In those instances, there are two tests, validity and collision-freeness, but underlying those two tests might be multiple criteria.

The collision check might be used to prevent the expression of trajectories that contain a predicted collision with any agent or obstacle with a "time-to-collision" value less than or equal to a "time-to-last-second-braking" value. A trajectory that contains any expected collision that is not avoidable should not be followed; or if all of the available trajectories include expected collisions, the trajectory that minimizes expected collision energy or other metric might be the selected trajectory.

The trajectories available to the TMP might have a hierarchy wherein a first trajectory is higher in the hierarchy than a second trajectory and the second trajectory is higher in the hierarchy than a third trajectory, etc. The first trajectory might be a nominal operating trajectory and trajectories lower in the hierarchy might correspond to non-ideal or error conditions, such as where a higher trajectory is not valid. For example, it might be that the first trajectory is a trajectory that is used, unless there is some error found with the first trajectory and the second trajectory is a contingent trajectory that would be used in that case.

In at least some examples, either one or more of a primary and/or secondary trajectory received may be stored to be used in a subsequent frame in the event that newly acquired trajectories are not valid and/or collision-free. Such trajectories may be referred to as stored trajectories. In any one or more example, any trajectory (either newly acquired or stored) may be modified if such modifications would lead to a scenario which prevents (or minimizes severity of, etc.) an impact. In some instances, such modifications might be limited to longitudinal modifications such as adding additional braking to the trajectory, but in other instances, other modifications (e.g., slight swerving) might be provided for. In accordance with the hierarchies, the system may prefer the first (or primary), secondary (or alternate/contingent), modified secondary, modified stored secondary, and finally, if none of the above trajectories mitigate a collision, an emergency stop (also referred to herein as an "E-Stop"). In such examples, the E-Stop may be a trajectory that seeks to bring the autonomous vehicle to a stop quickly, within the mechanical abilities and passenger safety limits of the autonomous vehicle.

It should be understood that examples and descriptions herein that refer to these specific set of trajectories could be modified to cover examples with other sets of trajectories that are provided in a hierarchy. Also, while the specific example provides for a strictly ordered hierarchy, some instances might provide for a hierarchy where more than one type of trajectory has the same level. In such an instance, there might be a first, second, third, and fourth trajectories with the first trajectory being considered highest on the trajectory, the second and third considered equally at the next lowest level, and the fourth being the lowest level trajectory.

In the general case, there is a hierarchy of trajectories and when in a normal operating state, the TMP considers the first trajectory and uses it if it is valid and collision-free. In that normal operating state, each of the trajectories can be checked at each frame when new trajectories are provided and the highest valid and collision-free trajectory is used. In at least some examples, if either of the primary or secondary are collision-free and valid, the TMP may select such a trajectory even where lower level trajectories are not valid or not collision-free. The TMP can then store a state variable representing the trajectory used. If the normal operation is such that the first trajectory is valid and collision-free, then dropping down to a lower trajectory can be indicative of an error or anomalous situation. For example, first trajectory might be valid and collision-free when generated, but then a fast-moving object passes in front of the autonomous vehicle so that when the first trajectory is checked, it validates, but is not collision-free. This would result in the TMP using a lower trajectory and updating the state variable to indicate which was used. The stored value of the state variable might be used in future frames to limit what trajectory the TMP uses, at least until there is a release of the error condition.

The collision check might involve executing a free space checker, evaluating an object list based trajectory predictor, a processor using machine learning with a heatmap, or other approaches. Some trajectories might be checked at every frame for possible collisions, but other trajectories might not need to be checked. For example, if an emergency stop ("E-Stop") trajectory is the lowest possible trajectory, it might not need to be repeatedly checked to determine if it will result in a collision, as that trajectory is likely the last resort and has a goal of slowing and likely already represents a last option for coming to a stop, with a locking of steering and applying maximum deceleration (by braking or otherwise), and is likely only to be used when there are multiple system failures or having questionable status.

In general, a trajectory can be represented by a data structure that defines vectors, paths, vehicle states, controls, etc. to be performed over time, from a start state to a terminus of the trajectory. A trajectory might not necessarily play out to its terminus, and might be overridden. The trajectories provided to the TMP might be trajectories that involve the vehicle slowing to a stop and trajectories that involve the vehicle moving according to some details of the trajectory, changing direction, changing speed, etc. A trajectory might include data representing signals that are to be sent to drive actuators, such as those for brakes, steering, accelerators, suspensions, etc.

A trajectory that, if followed to its terminus, would necessarily lead to the vehicle stopping due to abnormal or safety conditions is referred to herein as a stopping trajectory, while others are nominal trajectories. Some nominal trajectories may bring the autonomous vehicle to a stop, for nonanomalous conditions, such as driving up to a stop sign, stopping at a stop light, waiting for a pedestrian to cross, pulling over to pick up people, etc. A stopping trajectory has a stationary position as a terminus for safety-related reasons or anomalous conditions.

The TMP might also have a stored stopping trajectory that is used by the TMP when it has no other proffered trajectory that meets the TMP's criteria. If played out to the end of the trajectory, the stored stopping and or received stopping trajectories would end with the vehicle being stationary. In other words, the terminus of such a trajectory is a stationary vehicle. Not all trajectories are necessarily played out to their terminus. For example, if a trajectory is to take a vehicle from 50 MPH to 60 MPH over the course of thirty seconds but ten seconds in, a sudden obstruction appears, that trajectory might be quickly replaced with a stopping trajectory or an emergency stop trajectory in which the primary goal is to stop the vehicle without other considerations such as passenger comfort. In at least some examples, stopping trajectories may comprise secondary and/or contingent trajectories as described above. In some examples, such stopping trajectories may not involve coming to a stop, but may provide alternate paths and/or controls as a contingency for problems with a primary trajectory.

The AI might provide just two trajectories, a primary (nominal) trajectory and a secondary (e.g., stopping) trajectory, but in some instances, the AI might provide more than two. One example would be where the AI provides a primary trajectory that has the vehicle continuing in a lane, a primary trajectory that has the vehicle pulling over in ~10 seconds, a secondary trajectory that has the vehicle braking, a secondary trajectory that has the vehicle changing lanes and braking, etc. In another example, the AI creates and emits a new primary trajectory and a new secondary trajectory every 100 ms or so. A modified secondary trajectory might be a trajectory that the TMP created by applying a longitudinal declaration to a secondary trajectory.

In a more general case, what is provided is a set of instructions, which could be instructions about a trajectory and one, two, or more sets of instructions could be provided. Other sets of instructions might be generated from those provided, such as a set of instructions derived from a previously provided set of instructions that are stored, a set of instructions that are transformed or modified versions of a received set of instructions, and a fixed set of instructions. Where the set of instructions includes a trajectory, it might include instructions unrelated to a trajectory, such as instructions for messages, lighting, etc., and/or instructions some-what related to a trajectory, such as turn signaling or other actions to be taken in connection with a trajectory. In this case, a state variable might be provided for that represents a maximum level in a hierarchy of levels where a set of instructions having a level above that maximum level would not necessarily be executed, and when a set of instructions is found to be invalid or anomalous, the maximum level is set to a level below the level of that invalid or anomalous set of instructions. The state variable might remain at that level or below until a release signal is received, resetting the state variable to a higher level, perhaps the highest level. For example, a request indicative of selecting a contingent trajectory over a nominal trajectory might set the state variable to represent a vehicle trajectory state that is a contingent state representing selecting a contingent trajectory over a nominal trajectory and a release signal might to reset the vehicle trajectory state to a nominal request state indicative of selecting a nominal trajectory over a contingent trajectory. The release signal might be one received from a remote system configured to transmit signals in response to receiving an input from a user.

In an example system, a system monitor monitors states of systems within the vehicle and can send a request to the TMP that can override the TMP's decision as to the trajectory in a "downward" direction (e.g., primary to secondary to modified secondary to stored secondary to modified stored secondary to "E-Stop", etc.). The request might be a request for a particular type of trajectory, selected from primary, secondary, or "E-Stop" that the system monitor would use to signal that the system monitor would deem either of those to be acceptable options. The request might be an override request that requests a contingent trajectory over a nominal trajectory. In some logic tables, the ultimate result is the same for more than one system monitor trajectory type request. As an example, if the TMP is going to decide to invoke a secondary trajectory request based on some combination of states, the outcome may well be the secondary trajectory whether the system monitor requests the primary trajectory type or the secondary trajectory type. In places herein, that might be referred to as the system monitor specifying a primary or secondary trajectory type, but should be understood as described above.

In another example, if the AI provides trajectories to the TMP and the TMP finds all of those to be acceptable, it might select a primary trajectory, but then if the system monitor processed inputs to indicate that all four tires on a four-tire vehicle had tire pressures of 15 PSI (i.e., running flat), the system monitor would signal a request for an "E-Stop" trajectory.

In operation, the system monitor might signal for a secondary trajectory when an anomalous situation was sensed, such as detecting a mechanical or electrical error. In response, the TMP might provide the drive manager with a secondary trajectory and while the drive manager was actuating the secondary trajectory to bring the autonomous vehicle to stationary, the system monitor might detect a satisfactory resolution to the problem and signal a request for a nominal (e.g., primary) trajectory while the TMP would otherwise provide another trajectory.

In some instances, recovery from some conditions is deemed significant enough to require human intervention. In such cases, the system monitor might issue a request for a secondary trajectory or "E-Stop" trajectory until it receives a fault clearing signal from a human-interactive system (and/or a remote system having additional computation ability for an artificially intelligent decision), such as a system monitor release signal from a teleoperator system.

FIG. 1 is a high-level block diagram illustrating examples of some elements of an autonomous vehicle management and/or control system 100, including a primary compute unit 102 and a secondary compute unit 104. The primary compute unit 102 and the secondary compute unit 104 might be distinct processors with a communication channel between them, or some other structure. As illustrated, the primary compute unit 102 executes a system monitor AI 110, a trajectory planner AI 112, and stores sensor data 114, and the secondary compute unit 104 executes a system monitor 120, a trajectory manager process ("TMP") 122, and a safety/perception free corridor checker 124.

The system monitor AI 110 receives data such as might be included in messages transmitted from the system monitor 120 relating to status of various components of a monitor of an autonomous vehicle. Examples might include power systems, tire systems, environmental sensor systems, battery monitors, etc. The system monitor 120 might also receive messages from actuator systems relating to status and operation of those actuator systems. The system monitor AI 110 might receive data messages from other sources as well. When operating, the system monitor AI 110 might process those inputs to determine a system monitor AI output, such as a trajectory type request message sent to the system monitor 120. As an example, the system monitor AI 110 might determine that a nominal trajectory is the type of trajectory to be using or that an emergency stop type or a stopping type trajectory in which the autonomous vehicle comes to a stop due to some anomaly or other than nominal condition. The system monitor 120 might output actuator diagnostics messages.

The trajectory planner AI 112 considers various states, conditions, and/or inputs and generates one or more trajectories. A trajectory might be represented by a trajectory data record passed in a trajectory data message. A trajectory data record might include a timestamp indicating when the trajectory was created, details of direction, speed, inputs to actuators, etc. over a frame covered by the trajectory. For a given frame, the trajectory planner AI 112 might output one or more trajectories to a trajectory manager process ("TMP") 122 and might include a nominal trajectory and a contingent trajectory to be used if the nominal trajectory is not valid or contains a collision or when the TMP 122 determines that it is not to execute the nominal trajectory. The trajectory planner AI 112 might receive warning messages from the TMP 122, such as messages indicating that the TMP 122 cannot process some trajectories.

The sensor data 114 might include point cloud data, such as vehicle surroundings represented by a point cloud, image data, radar data, and other sensor data and included in messages. The primary compute unit 102 can provide this sensor data 114 in messages to the safety/perception free corridor checker 124, which might use that information to provide a transformed (modified) trajectory with maximum deceleration to the TMP 122.

In addition to receiving messages from actuator systems relating to status and operation of those actuator systems and trajectory type request messages from the system monitor AI 110, the system monitor 120 might receive a system monitor release signal in received messages from a teleoperator system. Based on its inputs, the system monitor 120 might output a trajectory limit message to the TMP 122 limiting what trajectories the TMP 122 can select. The trajectory limit message might be an indication that the TMP 122 is not to execute a nominal (e.g., primary) trajectory and should execute one that results in the AV coming to a stationary position, or otherwise. The trajectory limit message might be an indication that the TMP 122 is to execute an emergency stop trajectory.

The system monitor 120 also can output a clearing message, such as a "Clear to Go" message, signaling to the TMP 122 that it can select the highest level trajectory again. This might be used where the TMP 122 used a lower level trajectory due to an earlier request by the system monitor 120 or because higher level trajectories were not valid and collision-free and the TMP 122 maintains that level until released by either the "Clear to Go" message or a system monitor release signal. In some instances, the system monitor release signal is required for a release. In some instances, the system monitor release signal is received by the system monitor 120 from a human operator using a teleoperator system after reviewing data from the vehicle. In some instances, the system monitor release signal is received directly by the TMP 122.

As explained elsewhere herein in further detail, the TMP 122 determines, from the trajectories it has available to it, the levels of the trajectories in a trajectory hierarchy, the level that the TMP 122 is capped at, and the validity and collision-free condition of the trajectories, the TMP 122 outputs a trajectory data message to a drive manager. Some of the processing of a trajectory might be performed by the TMP 122 and some might be performed by the drive manager.

Figure 2:
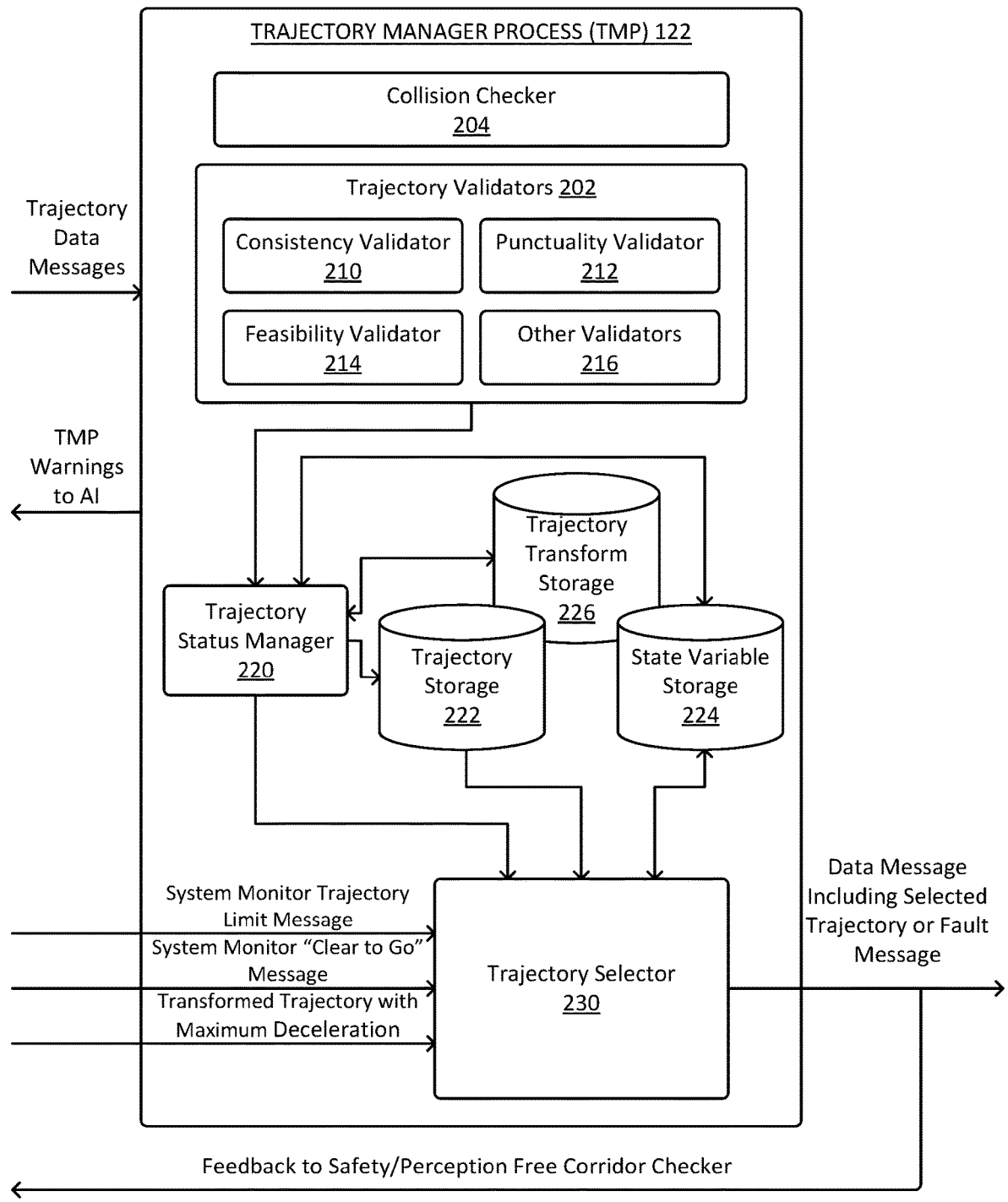
FIG. 2 is a block diagram illustrating elements of the trajectory manager process ("TMP") of FIG. 1 for validating and/or confirming trajectories received.

FIG. 2 is a block diagram illustrating elements of the TMP 122 from FIG. 1 in greater detail, including a collision checker 204, trajectory validators 202, a trajectory status manager 220 and a trajectory selector 230. In some instances, the TMP might include a distinct process and system for collision avoidance.

The trajectory validators 202 might include a consistency validator 210, a punctuality validator 212, a feasibility validator 214, and other validators 216 that might run other tests on a trajectory. The collision checker 204 checks a trajectory to determine whether it is collision-free. The results of the validity checks and collision checks might be provided to the trajectory status manager 220, which might store trajectories in trajectory storage 222 along with those results.

In the general case, the TMP 122 has available to it a plurality of trajectories, some of which might be received from an AI system of the primary compute unit 102, some of which were stored from prior frames, some of which are modified versions of received trajectories wherein a received trajectory is transformed and the transformation and/or the transformed trajectory are stored in a trajectory transform storage 226, and some might be relatively fixed trajectories (such as an emergency stop type trajectory). The AI-provided trajectories might be generated by the AI system based on sensor data, where the sensors might provide information about the road, the weather, surroundings, etc. The provided trajectories might include a trajectory that is expected to be a nominal trajectory and one or more contingent trajectory in case the nominal trajectory is not usable.

The trajectories stored in trajectory storage 222 might include a nominal trajectory and various contingent trajectories that might or might not terminate with the vehicle being stationary. A stored contingent trajectory might be a contingent trajectory from a previous frame that the TMP 122 received and stored, perhaps one that the TMP 122 received and chose not to use, using a received nominal trajectory instead. Another example is a transformed contingent type of trajectory that is derived from a received contingent trajectory, but modified to avoid a possible collision (i.e., a collision avoidance trajectory) possibly by adding iteratively increasing braking applied up to a maximum deceleration, adjusting by a small distance longitudinally, and/or making other minor changes to avoid a collision without totally abandoning a trajectory. Yet another example is a transformed stored contingent type of trajectory that is derived from a stored contingent trajectory, but modified in a similar manner. Yet another example is an emergency stop type of trajectory, with the maximum declaration applied immediately, instead of iteratively increasing braking, with locked steering.

The VAL and CF values could be determined from validity constraints and data about a prior or currently playing trajectory. Using those values, the trajectory selector 230 selects a trajectory, which might provide binary values and an indicator of which trajectory to select based on those binary values.

A system monitor AI system might monitor health of components of the autonomous vehicle and from that issue requests for which of the available trajectories to use. For example, the system monitor AI system might note a condition that while not safety related or something requiring an emergency stop, and then would indicate that the autonomous vehicle should use a contingent trajectory that brings the autonomous vehicle eventually to a stop. This request might be related to component/subcomponent health. In at least some examples, additional information (such as, but not limited to, weather, friction, etc.) may be used by the system monitor in making the determination of which trajectory to request.

In a specific example, if the TMP uses a contingent trajectory either because a higher trajectory failed a validity test or a collision check or because the system monitor indicated that a contingent trajectory should be used, the TMP will record the level of trajectory it used into a state variable storage 224 and will use no higher-level trajectory until a release is signaled. The release might have different levels of release and those might be dependent on the severity of the anomaly that led to the use of a contingent trajectory. For example, if the anomaly was a minor power drop in one of the batteries but the power returned to normal on its own, that might be one level of anomaly and the system monitor AI system might be given authority to issue a release.

More generally, the system monitor sends a trajectory limit message to the TMP 122 indicating that it should not use a trajectory that has a level above a limit specified in the trajectory limit message, until a release is issued. For example, the trajectory limit message might indicate that no trajectory higher than the first contingent trajectory should be executed. In that case, the TMP would pass on executing the nominal trajectory that is higher in the trajectory hierarchy.

Once the release is issued, the TMP can then use the highest-level trajectory that passes its tests. For some anomalies, such as where all of the trajectories when checked were found to be invalid and the TMP had to use the emergency stop trajectory, perhaps a higher level of release might be required. Such a higher level might require a human review of conditions and a human response clearing the anomaly.

The trajectory storage 222 might contain storage for the various trajectories that the trajectory selector 230 can select from and for each might contain a type indicator, data describing the trajectory, a VAL value indicating whether the TMP 122 determined that the trajectory is valid, and a CF value indicating whether the TMP 122 determined that the trajectory is collision-free. In some instances, there might not be explicit storage for each of the data objects shown.

The trajectory selector 230 selects a trajectory, perhaps from trajectory storage 222, based on whether it is valid, collision-free, and possibly other conditions, as explained in more detail herein, and then sends a message with the proposed trajectory to a drive manager. The trajectory selector 230 takes into account the state variable in the state variable storage 224 that represents the "current level" of the TMP 122. As explained elsewhere herein, the TMP 122 evaluates trajectories and uses the one that is highest on a hierarchy unless its state indicates that it should not be above a specified level. An example hierarchy is from a nominal trajectory to an emergency stop trajectory. The specified level might be due to the system monitor 120 indicating a highest allowed level or due to the TMP 122 processing trajectories and finding that the highest level trajectories are not valid or contain collisions. In some instances, the current level of the TMP 122 remains the same from frame to frame if the trajectory at the current level is valid and collision-free and no external signals are received to lower the level, the current level of the TMP 122 goes down if the trajectory at the current level is not valid or is not collision-free or an external signal is received to lower the level. In such instances, the TMP 122 looks for a system monitor "Clear to Go" signal and/or a system monitor release signal.

Once the trajectory selector 230 selects a trajectory, it sends a data message to a drive manager consistent with the selected trajectory. Where no trajectory is available, or for other reasons, the trajectory selector 230 may send the drive manager a fault message and/or default to an "E-Stop." The trajectory selector 230 might also provide its output as feedback to the safety/perception free corridor checker 124.

In some situations, the trajectory status manager 220 will consider a trajectory and determine that it is valid, but not collision-free, and determine that a transform of the trajectory would be collision-free. For example, there might be a hierarchy, from highest to lowest, of a nominal trajectory, a first contingent trajectory, a stored contingent trajectory, a transformed contingent trajectory that is a transformation of a valid first contingent trajectory that has collisions into a collision-free trajectory, a transformed stored contingent trajectory that is a transformation of a valid stored contingent trajectory that has collisions into a collision-free trajectory, and an emergency stop trajectory. Examples of transformations include adding additional braking to a trajectory to make it collision-free. In such examples, the TMP 122 may continue to execute such a trajectory until terminus, or otherwise released in accordance with the techniques described herein.

The trajectory transform storage 226 might store the details of such transformations if needed in future frames. A transformed contingent trajectory might be stored as a complete trajectory and used in future frames. In that instance, if a first contingent trajectory is transformed into a transformed contingent trajectory and that transformed contingent trajectory is used, then in future frames that transformed contingent trajectory is reused until there is a release allowing the TMP 122 to use a higher level trajectory. If the transformed contingent trajectory is no longer valid and collision-free, a lower level trajectory would be used. In some instances, a separate trajectory transform storage is not used and the transformed trajectories are simply stored in the trajectory storage 222.

When the trajectory selector 230 receives the system monitor "Clear to Go" signal and/or the system monitor release signal, it can update the state variable storage 224 to indicate the new maximum allowed trajectory level. In a typical process, the system monitor clears the TMP 122 to use the highest-level trajectory available, but in some processes, the system monitor might partially clear the TMP 122 to a level above its current level, but not the to the highest level.

Figure 3:
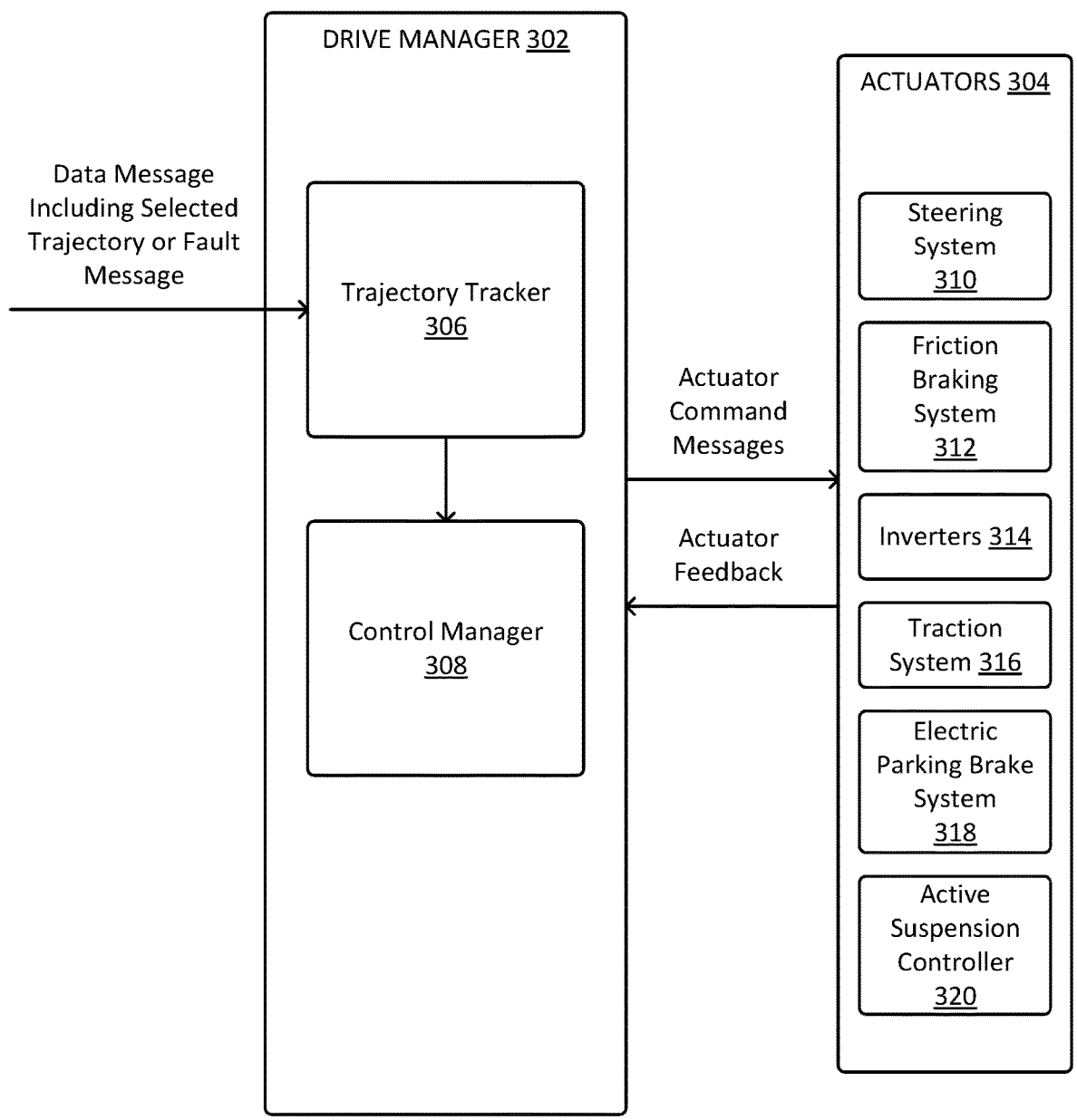
FIG. 3 is a block diagram illustrating elements of a drive manager that interfaces with actuator systems of an autonomous vehicle.

FIG. 3 is a block diagram illustrating elements of a drive manager 302 that interfaces with actuator systems 304 of an autonomous vehicle. As illustrated there, the drive manager 302 might include a trajectory tracker 306 that maintains a data structure containing a trajectory passed to the drive manager 302 from a trajectory selector such as the trajectory selector 230 illustrated in FIG. 2. The drive manager 302 might also include a control manager 308.

Examples of actuators in the actuator systems 304 might include a steering system 310, a friction braking system 312, inverters 314, a traction system 316, an electric parking brake system 318, and an active suspension controller 320.

In operation, the drive manager 302 might output actuator command messages to the actuator systems 304 and might receive feedback messages from the actuator systems 304. Such feedback messages may be used by the system monitor in determining a requested trajectory.

Figure 4:
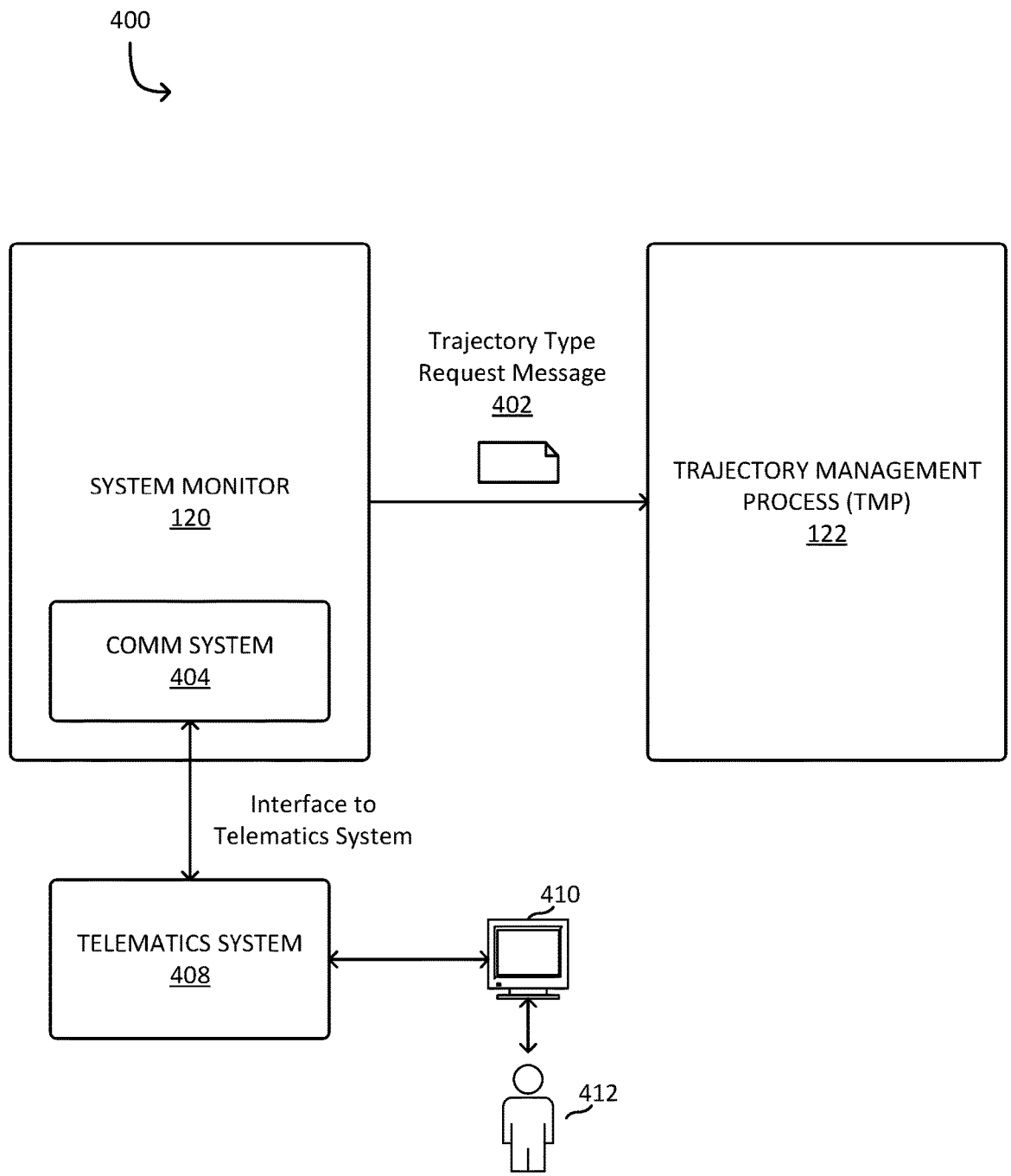
FIG. 4 is a block diagram illustrating an alternative view of a system monitor and a trajectory manager process ("TMP").

FIG. 4 is a block diagram illustrating an alternative view 400 of the system monitor 120 and the TMP 122. FIG. 4 does not necessarily show all the data structures that might be present and some of those shown might be logical data structures and/or remote or distributed data structures. As illustrated there, the system monitor 120 might have a communications system 404 that interfaces to a telematics system 408 that is remote from the autonomous vehicle and can present information on a display 410 used by a telematics operator 412 to consider information and provide signals and inputs to the autonomous vehicle.

The requirements for which kind of release signal is sufficient to release the TMP to a higher level trajectory use might require that for some levels, the release signal can only come from human interaction. The human interaction might be from a remote telematics operator using a system that provides telematics data to the human. In at least some examples, such a telematics operator may comprise a more powerful machine capable of running more sophisticated diagnostics to issue the clearance message.

As one example, the system monitor 120 might find some values or conditions to be out of normal operating range and send a query to the telematics system 408 while also sending a trajectory type request message 402 to the TMP 122 requesting a contingent trajectory that leads eventually to stopping and remaining in a stationary position after sensing an anomalous condition in the autonomous vehicle or the environment. In some instances, the anomalous condition might be so severe that the autonomous vehicle should not start moving once brought to a stationary position until the telematics operator 412 has assessed the conditions and determined that the anomalous condition is sufficiently cleared.

For example, if the system monitor 120 detects a fault that should lead to the autonomous vehicle stopping for safety reasons and issues a trajectory type request to the TMP 122, but then the telematics operator 412 determines that the fault is no longer present or is not an actionable fault, the telematics operator 412 might direct the telematics system 408 to send a system monitor release signal (e.g., a "release to Go" message) to the system monitor 120. This mechanism creates a situation where, once the autonomous vehicle is stopped, the system monitor 120 would be telling the TMP 122 to keep it stopped, until the system monitor 120 receives a "release to Go" message.

Figure 5:
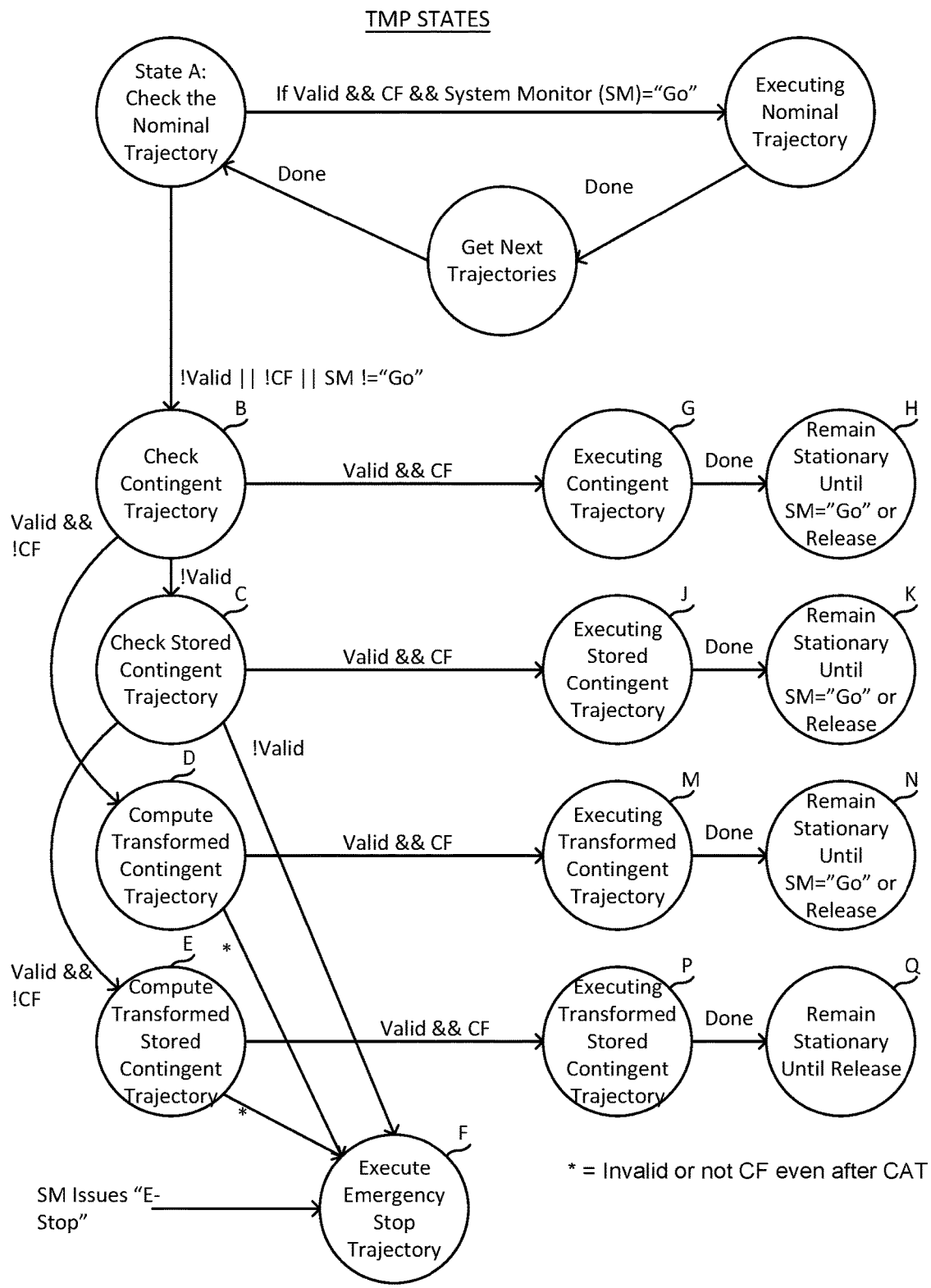
FIG. 5 is a state diagram as might be implemented in a TMP that is processing trajectories and selecting a trajectory and/or modifying a trajectory.

FIG. 5 is a state diagram as might be implemented in a TMP that is processing trajectories and selecting a trajectory and/or modifying a trajectory. Such a state diagram may illustrate how a system (such as an autonomous vehicle system) may move from one operating mode (e.g., a nominal mode) to a contingent mode or back-up mode. The TMP may receive one or more trajectories for a frame and/or a request from a system monitor indicating a requested trajectory for the frame. Either of these might be synchronously received and/or asynchronously received.

The operating mode may have a trajectory associated with that mode. For example, a nominal mode might have a trajectory that moves the system along a path, such as moving an autonomous vehicle along a path from a starting location to a destination while observing constraints related to the road, the autonomous vehicle, and/or the passengers, whereas a contingent mode might have a trajectory associated with it that moves the autonomous vehicle along a path that brings the autonomous vehicle to a stop while avoiding collisions.

In the state diagram of FIG. 5, the states correspond to operating modes and the TMP might store a state variable indicating the state. Alternatively, the TMP might derive its state from other information. The TMP has available to it a number of trajectories.

When in a first state (shown as "State A" in FIG. 5), the TMP validates a received nominal trajectory, which might be referred to as a primary trajectory, against one or more validation tests, such as those illustrated in FIG. 2. From State A, if the trajectory is valid and collision-free and the system monitor is allowing for a nominal trajectory (such as by not sending a trajectory limit message or indicating that the TMP is cleared to use any trajectory), the TMP will process that trajectory and set its state variable to indicate that state. The TMP might process the trajectory by executing it or passing it to another subsystem for execution. In a next frame, the TMP might obtain trajectories for that next frame and return to State A.

The TMP might receive more than one nominal trajectory along with contingent trajectories and possibly also one or more trajectory that the TMP generates itself, such as by modifying a received trajectory. In examples described herein, the TMP might receive only one nominal trajectory. The TMP might check the other trajectories to determine if they are valid and collision-free each frame or, in some instances, might only check other trajectories if the TMP determines that it might use such trajectories, such as where a trajectory higher in the hierarchy of trajectories is not valid or is not collision-free. The nominal trajectory might involve stopping, such as where under normal conditions a vehicle comes to a stop at a stop sign, to embark or disembark passengers, etc.

Figure 6:
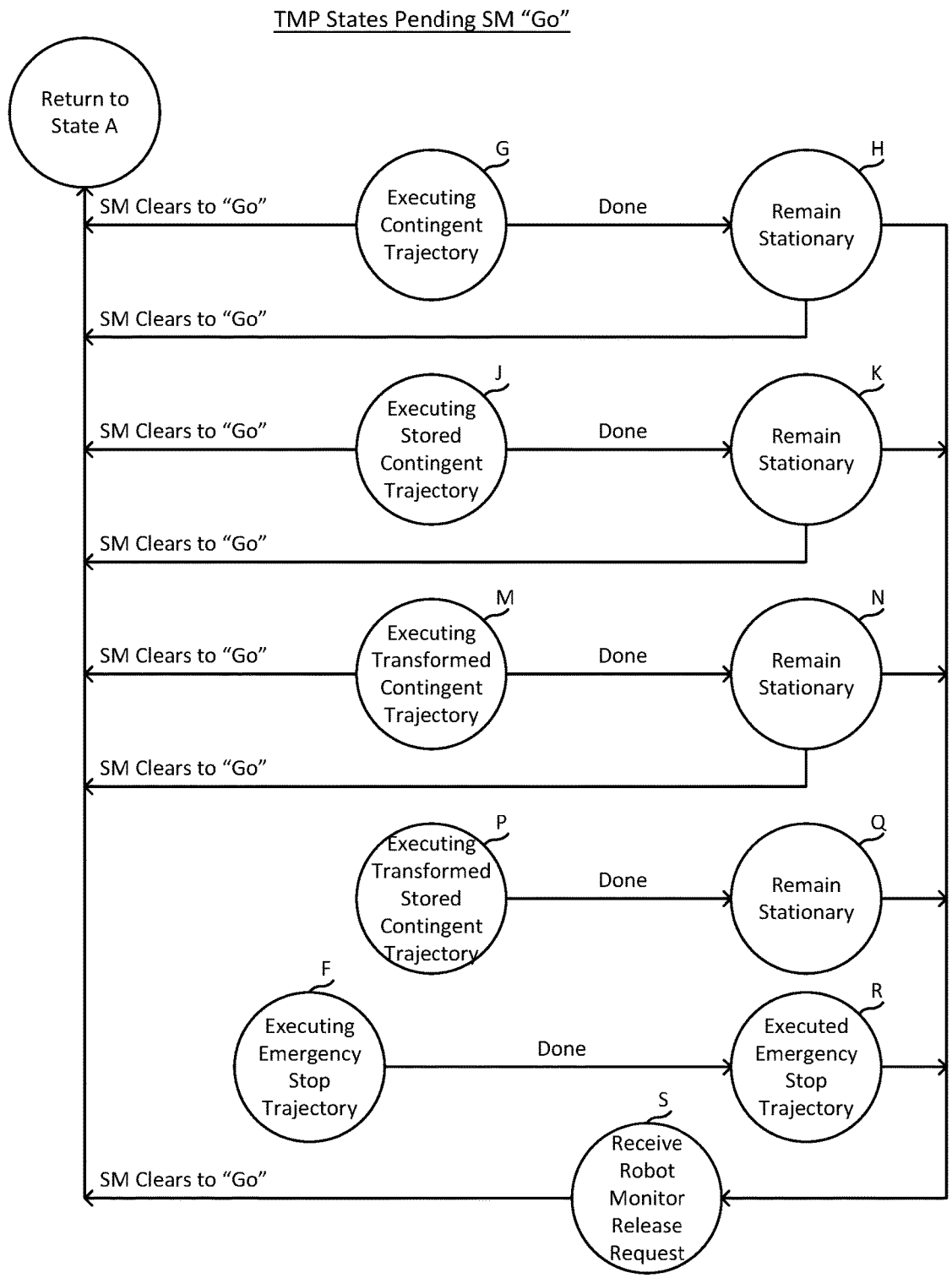
FIG. 6 is a state diagram as might be implemented in a TMP representing states of the TMP upon selecting a trajectory other than a nominal trajectory representing nominal operation.

From State A, if any of those conditions is not satisfied, e.g., the TMP determines that the nominal trajectory is not valid, or it is not collision-free, or the system monitor has indicated that the TMP should not use the nominal trajectory (shown in FIG. 5 as the system monitor signaling anything other than "Clear to Go"), then the TMP transitions to State B, where checks a received first contingent trajectory for validity and collisions. If the first contingent trajectory is both valid and collision-free, the TMP moves to State G, executes that first contingent trajectory (again by either executing it or passing it to another subsystem for execution) and when done, moves to State H. In this example, State H is a state where the autonomous vehicle is stationary. As is illustrated in FIG. 6, the TMP maintains this state until it receives a "Clear to Go" signal from the system monitor and/or receives a system monitor release request from a human-monitored system, such as a telematics system, in accordance with techniques described herein.

In State B, if the TMP determines that the first contingent trajectory is not valid, the TMP transitions to State C and tries a second contingent trajectory, which might be a stored contingent trajectory from a prior frame. In State B, if the TMP determines that the first contingent trajectory is valid but is not collision-free, the TMP transitions to State D and tries to modify the first contingent trajectory by transforming it into a third contingent trajectory.

In State C, the TMP checks the second contingent trajectory for validity and collisions. If the second contingent trajectory is both valid and collision-free, the TMP moves to State J, executes that second contingent trajectory (by executing it or passing it for execution) and when done, moves to State K. In this example, State K is also a state where the autonomous vehicle is stationary. The TMP also maintains a state variable indicative of its allowed level in the hierarchy, so once it reached State C, in a future frame it will skip State A and State B until a release is received.

In State C, if the TMP determines that the second contingent trajectory is not valid, the TMP transitions to State F and executes an emergency stop trajectory, which should be rare as it requires that the nominal trajectory not be executable and that both contingent trajectories are invalid.

In State D, the TMP checks the third contingent trajectory for validity and collisions. If the third contingent trajectory is both valid and collision-free, the TMP moves to State M, executes that third contingent trajectory (by executing it or passing it for execution) and when done, moves to State N. In this example, State N is also a state where the autonomous vehicle is stationary. The TMP also maintains a state variable indicative of its allowed level in the hierarchy, so once it reached State D, in a future frame it will skip States A, B and C until a release is received.

In State E, the TMP checks the fourth contingent trajectory for validity and collisions. If the fourth contingent trajectory is both valid and collision-free, the TMP moves to State P, executes that fourth contingent trajectory (by executing it or passing it for execution) and when done, moves to State Q. In this example, State P is also a state where the autonomous vehicle is stationary. The TMP also maintains a state variable indicative of its allowed level in the hierarchy, so once it reached State E, in a future frame it will skip States A through D until a release is received.

In States D or E, if the TMP determines that it is not possible to transform the contingent trajectory into a transformed trajectory that is collision-free (or something happens to make it no longer valid or the transformation makes it invalid), the TMP moves to State F. Also, if the system monitor, perhaps in response to detecting a systems error, mechanical error, electrical error, etc., sends a message to the TMP to execute an emergency stop, the TMP moves to State F.

Thus, as explained with reference to FIG. 5, the TMP can identify a state to be in and a trajectory to execute. As each of the contingent trajectories is likely in response to an error or an unexpected condition, the TMP would not resume nominal operation until receiving a release signal.

FIG. 6 is a state diagram as might be implemented in a TMP representing states of the TMP upon selecting a trajectory other than the nominal trajectory. Examples of states where the TMP is executing some type of contingent trajectory include State G (where the TMP executes a first contingent trajectory received from a trajectory planner AI that is a valid and collision-free trajectory), State J (where the TMP executes a stored contingent trajectory previously received from the trajectory planner AI that is a valid and collision-free trajectory), State M (where the TMP executes a transformed version of the first contingent trajectory to make it collision-free), State P (where the TMP executes a transformed version of the stored contingent trajectory to make it collision-free), and State F (where the TMP executes an emergency stop trajectory).

In states other than State P and State F, it might be that the TMP can return to State A if the system monitor requests a nominal type trajectory but once the autonomous vehicle is stationary (or, in some instances, has a nonzero velocity, but that velocity is less than or equal to a threshold velocity), a release signal received from the telematics system is required to have a transition to State A. For example, in State F, as the TMP executed an emergency stop, and transitioned to a stationary state, State R, the TMP would remain in that state, and the autonomous vehicle would remain stationary, until in State S, the TMP receives a release request issued by a human operator.

As illustrated in FIG. 6, there are some states in which the system monitor's clearing of an anomalous condition could result in the autonomous vehicle moving again, or exiting from a state that would lead to the autonomous vehicle stopping, while there are other states in which a release signal is received from the telematics system is required in order to result in the autonomous vehicle moving again.

In a specific instance, the nominal trajectory is labeled a primary trajectory, the first contingent trajectory is labelled a secondary trajectory, the second contingent trajectory is a stored contingent trajectory, the third contingent trajectory is transformation of the first contingent trajectory, while the fourth contingent trajectory is transformation of the second contingent trajectory, but other possibilities for nominal and contingent trajectories are possible. It is not required that the nominal trajectory have the vehicle continue moving and it is not required that all of the contingent trajectories have the vehicle coming to a stop.

In a more general instance, there is a nominal mode where a nominal trajectory is being executed, a hierarchy of contingent trajectories where a highest level trajectory that is valid and collision-free is executed and the TMP will remain at that level until released. In the general instance, the levels might be such that higher levels can be released by an automated system and lower levels require human review and intervention to release to a level higher than the level of the trajectory that ultimately was executed.

In some instances, the release from the system monitor might not be a complete and unconditional release (e.g., allowing the TMP back to the highest level and State A). Instead, the system monitor release might be to some level higher than a current TMP level, but less than the highest level.

While FIG. 6 illustrates that the system monitor can clear from States H, K, and N, in some instances, the TMP might be programmed to allow for a system monitor release from States G, J, and M—states in which the autonomous vehicle is moving, but require more than the system monitor release from States H, K, and N. Other variations should be apparent upon review of the figures and the descriptions herein. Further, though illustrated as the system monitor clearing to "Go" (or to the primary trajectory), the system monitor may clear to any other level, as would be reflected in the state diagram described with respect to FIG. 5.

Figure 7:
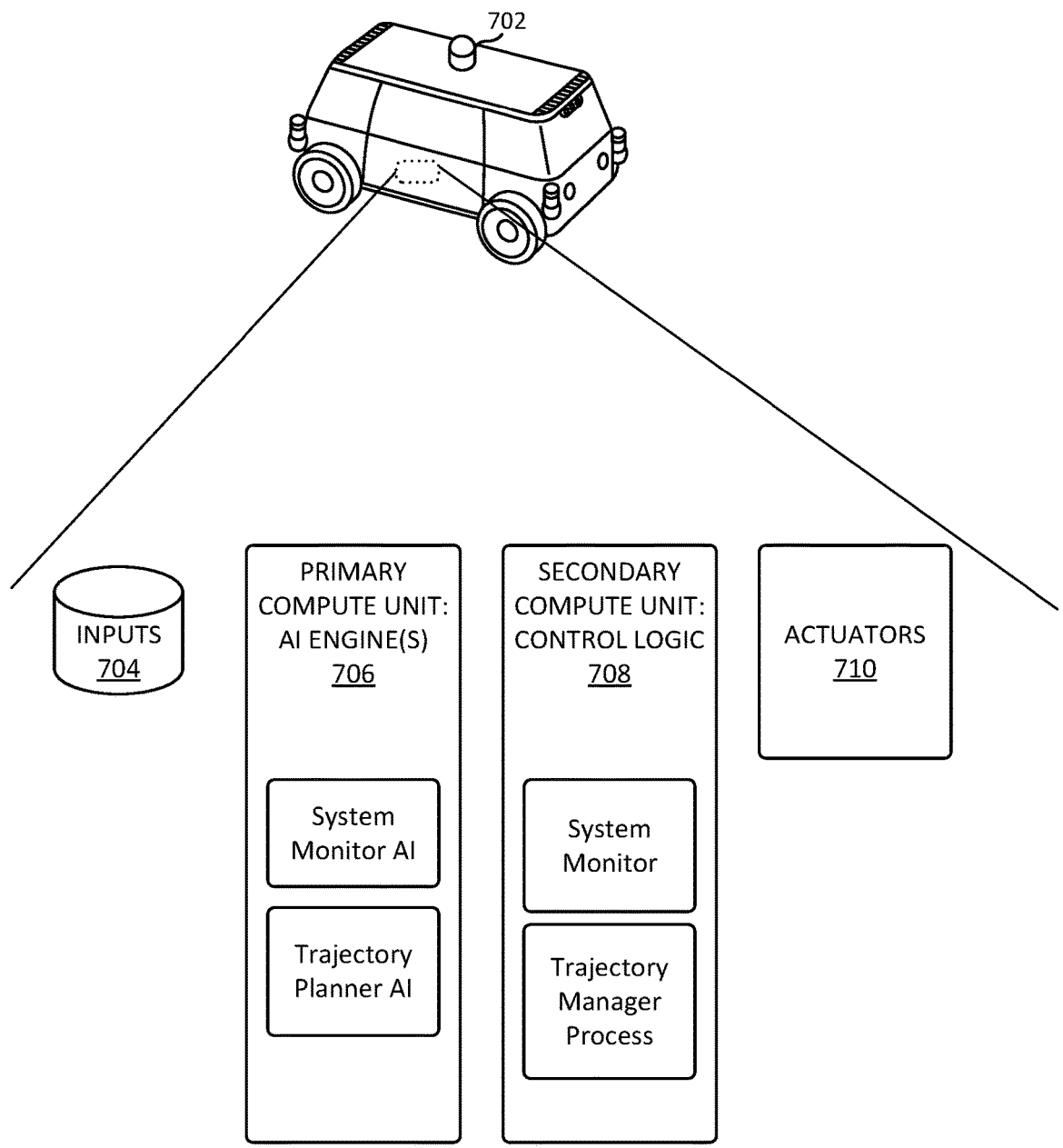
FIG. 7 illustrates some elements of an autonomous vehicle.

FIG. 7 illustrates some elements of an autonomous vehicle 702, including inputs 704, a primary compute unit 706 that might include one or more AI engine, a secondary compute unit 708 that might include control logic, and actuators 710. In a specific example, the AI engines consider the inputs 704 and transmit selections, data, or other forms of messages to the control logic, which then processes the information and instructions provided into messages and/or signals sent to the actuators 710 that cause various electrical, mechanical, and/or electromechanical elements of the autonomous vehicle 702 to activate to move or stop the autonomous vehicle 702. The inputs 704 may include inputs from sensors present on the autonomous vehicle 702, inputs from external sources, such as weather systems, user inputs to a navigation system, and/or operator inputs. The AI engines might include a system monitor AI and a trajectory planner AI. The control logic might include a system monitor and a trajectory manager process.

Figure 8:
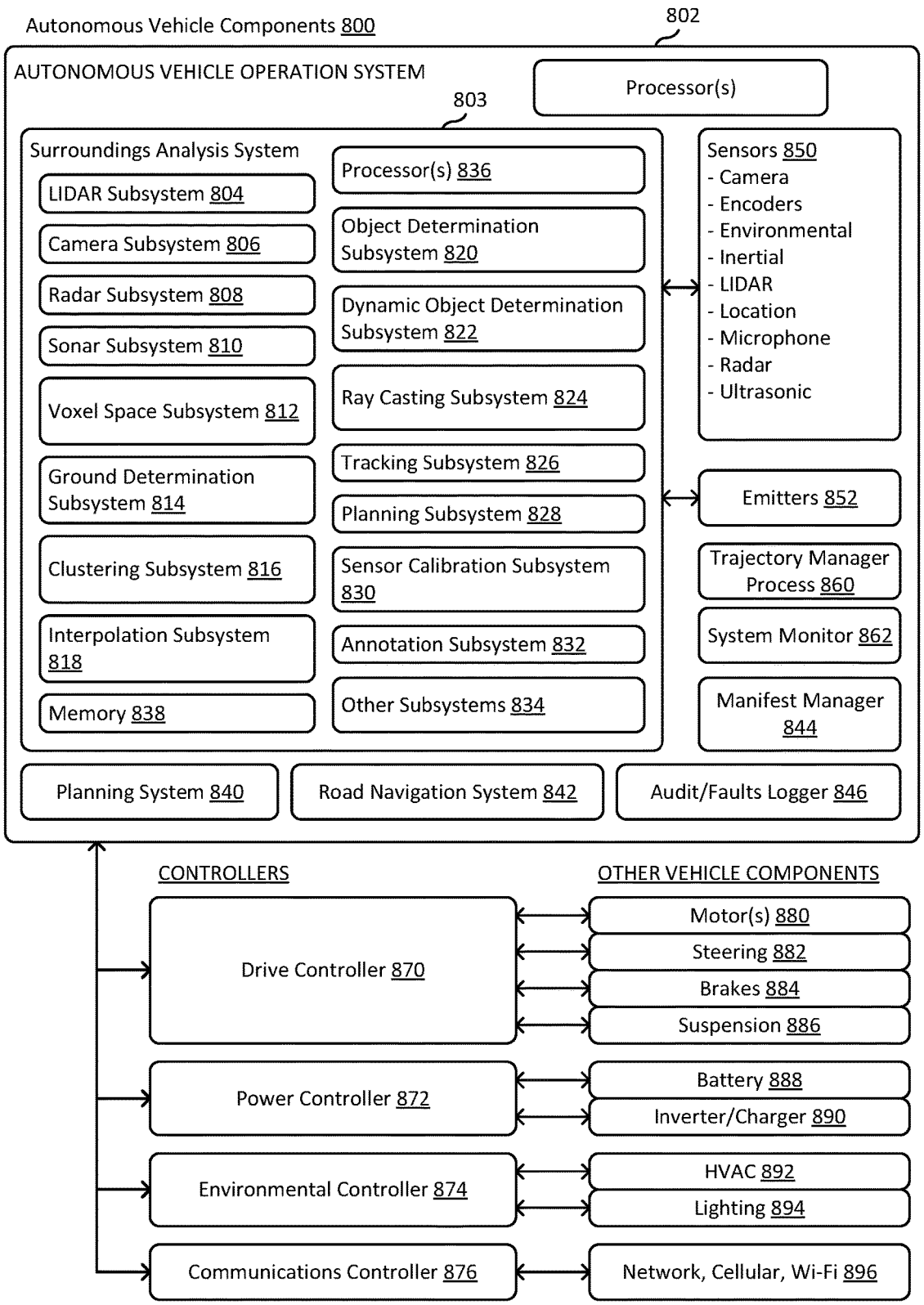
FIG. 8 illustrates an example of elements that might be used according to an architecture of an autonomous vehicle.

FIG. 8 illustrates an example of autonomous vehicle components 800 that might be used according to an architecture of an autonomous vehicle. The autonomous vehicle might be characterized as having an autonomous vehicle operation system 802, coupled to various controllers, that in turn are coupled to various components of the autonomous vehicle to handle locomotion, power management, etc. Elements of the autonomous vehicle operation system 802 provide for a computational system for implementing object identification and environment analysis, as described herein. These elements might find use in other applications outside of autonomous vehicles.

The autonomous vehicle components 800 may specify one or more computer system(s) including various hardware, software, firmware, etc. to implement aspects of the systems, methods, and apparatuses described herein. For example, the autonomous vehicle operation system 802 may include a surroundings analysis system 803 and other components usable for various aspects of an autonomous vehicle. The surroundings analysis system 803 might be used to take in information that the autonomous vehicle operation system 802 might use to operate controllers for a motor, steering, object avoidance, etc.

In one example, surroundings analysis system 803 is the system monitor 862 and is programmed to issue recommendations for trajectories.

The surroundings analysis system 803 might be organized as a plurality of subsystems to simplify implementation, allow for separate teams to develop for specific subsystems, or for other reasons. In some instances, the subsystems are implemented independently, while in other instances, more than one subsystem are integrated together in part or in full. The subsystems might include a LIDAR subsystem 804, a camera subsystem 806, a radar subsystem 808, a sonar subsystem 810, a voxel space subsystem 812, a ground determination subsystem 814, a clustering subsystem 816, an interpolation subsystem 818, an object determination subsystem 820, a dynamic object determination subsystem 822, a ray casting subsystem 824, a tracking subsystem 826, a planning subsystem 828, a sensor calibration subsystem 830, an annotation subsystem 832, and possibly other subsystems 834.

A given subsystem might be implemented with program code or hardware for communicating with other subsystems, to receive inputs and provide outputs. Some of the inputs might be from sensors. In some description herein, for readability, a subsystem might be described as including sensors the subsystem obtains data or signals from and/or emitters that the subsystem outputs data or signals to. For example, a sonar subsystem might be described as having an ultrasonic sensor or might be described as receiving signals from an ultrasonic sensor. As another example, a camera subsystem might be described has having a camera and a display or might be described as receiving signals or data from a camera and sending signals or data to a display.

Although not shown in FIG. 8, it should be understood that communication among subsystems can be provided for as needed. A given subsystem might communicate with another subsystem by sending data over some channel directly to the other subsystem, or the surroundings analysis system 803 might comprise a bus subsystem or communication infrastructure over which subsystems can communicate by passing data and/or signals therebetween. The surroundings analysis system 803 might also be configured to receive external data and to communicate information to outside the surroundings analysis system 803.

A given subsystem might have some of its own computational processing, which might be performed by hardware dedicated to that given subsystem or might be performed by a processor or circuit assigned to perform computation of that subsystem, as might be the case where the subsystem is implemented entirely in software and is executed by one or more processor(s) 836 using a memory 838, such as a program code memory and data storage memory. The memory might be for temporary storage of variables and data, such as RAM, and memory for permanent storage (i.e., data that persists without needing refresh, power, etc. for some period of life) and should be implied where indicated even if not explicitly mentioned. For example, where a subsystem is described as operating on a database or storing data, there would be some form of memory for storing data in electronically-readable form. In some cases, the database or data storage in memory is not specific and internal to one subsystem. In those cases, the memory is accessible by more than one subsystem. For example, one subsystem might create records based on sensor data obtained by that subsystem and write those records to a database or other data structure and, in turn, another subsystem can read and use that data. Where a subsystem is implemented in software, the subsystem might include program code coupled to a processor specific to that subsystem or a more general program code memory and processor.

In some instances, the surroundings analysis system 803 is employed in an autonomous vehicle. In some instances, the surroundings analysis system 803 may provide perception and planning functionality for the autonomous vehicle. In general, the surroundings analysis system 803 may provide for LIDAR perception, radar perception, vision (camera) perception, acoustic perception, segmentation and classification, tracking and fusion, and prediction/planning, as well as interfacing to other controllers, such as a drive controller, a power controller, an environmental controller, and a communications controller.

The autonomous vehicle operation system 802 may include a planning system 840, a road navigation system 842, a manifest manager 844, and an audit/faults logger 846. The autonomous vehicle operation system 802 might also include, or interface to, various sensors 850 and emitters 852.

The autonomous vehicle operation system 802 might interface to a drive controller 870 that interacts with motor(s) 880, steering 882, brakes 884, and a suspension 886, a power controller 872 that interacts with a battery 888 and an inverter/charger 890, an environmental controller 874 that interacts with heating, venting, air conditioning (HVAC) components 892 and lighting 894, and a communications controller 876 that handles communications between the autonomous vehicle, devices in use with the autonomous vehicle and external devices, such as via a network, a cellular channel, or a Wi-Fi channel 896. A combination of autonomous vehicle operation system 802, the controllers, and the vehicle components installed in an autonomous vehicle can provide for a vehicle that is able to navigate safely without constant human intervention.

The drive controller 870 might receive inputs from a trajectory manager process 860 (such as TMP 122), which might receive inputs from a system monitor 862 (e.g., system monitor 120) that together handle trajectories, avoid problematic trajectories, respond to anomalies and clear anomalies when warranted. The system monitor 862 might be incorporated into, or executed by a common processor with, the planning subsystem 828 or the planning system 840. Any or all such components may be those described herein (such as with respect to any of FIGS. 1-7), combinations thereof, or otherwise.

Referring again to the surroundings analysis system 803 and its subsystems, the LIDAR subsystem 804, the LIDAR subsystem 804 may include one or more LIDAR sensors to capture LIDAR data for segmentation, as described herein, and may comprise any one or more depth sensors as described in detail herein. In some instances, the LIDAR subsystem 804 may include functionality to combine or synthesize LIDAR data from a plurality of LIDAR sensors to generate a meta-spin of LIDAR data, which may refer to LIDAR data based on multiple LIDAR sensors. In the case of a meta spin of LIDAR data, the LIDAR subsystem 804 may include functionality to determine a virtual origin of the meta spin data (e.g., a coordinate reference frame common to all LIDAR sensors) and perform a data transformation such that LIDAR data from each of the one or more LIDAR sensors is expressed with respect to the virtual origin. As may be understood in the context of this disclosure, the LIDAR subsystem 804 may capture data and may transmit datasets to other subsystems of the surroundings analysis system 803 for subsequent processing.

The camera subsystem 806 may include, or interface to, one or more camera sensors to capture vision data for image segmentation and/or classification. The camera subsystem 806 may include any number and type of camera sensors. For example, the camera subsystem 806 may include any color cameras, monochrome cameras, depth cameras, RGB-D cameras, stereo cameras, infrared (IR) cameras, ultraviolet (UV) cameras, etc. As may be understood in the context of this disclosure, the camera subsystem 806 may capture data and may transmit datasets to the other subsystems for subsequent processing. For example, data from the camera subsystem 806 may be included as one or more channels of a multi-channel image that is processed as such by another subsystem.

The radar subsystem 808 may include one or more radar sensors to capture range, angle, and/or velocity of objects in an environment. As may be understood in the context of this disclosure, the radar subsystem 808 may capture data and may transmit datasets to other subsystems of the surroundings analysis system 803 for subsequent processing. For example, data from the radar subsystem 808 may be included as one or more channels of a multi-channel image provided to another subsystem.

The sonar subsystem 810 may include, or interface to, one or more speakers or sound emitters and one or more microphones (such as a microphone array) to capture acoustic information from objects in an environment. Additionally, or in the alternative, such a sonar subsystem 810 may comprise various ultrasonic transducers. For example, the sonar subsystem 810 may cause an ultrasonic transducer to emit pulses of sound and may listen for echoes to determine a position and/or motion information associated with objects in the environment. As may be understood in the context of this disclosure, the sonar subsystem 810 may capture data and may transmit datasets to the other subsystems for subsequent processing. For example, another subsystem of the surroundings analysis system 803 might fuse data obtained from the sonar subsystem 810 with data obtained from the LIDAR subsystem 804, in order to more accurately segment objects and/or to determine information about the objects, or for other purposes.

The autonomous vehicle operation system 802 may include any number or type of other sensors suitable for use in an autonomous vehicle beyond those illustrated. The various sensors 850 may include, but are not limited to, ultrasonic transducers, wheel encoders, environmental sensors, microphones, inertial measurement unit(s) (IMU), accelerometers, gyroscopes, magnetometers, temperature sensors, humidity sensors, light sensors, global positioning system (GPS) sensors, location sensors, etc.

In some instances, the LIDAR subsystem 804, the camera subsystem 806, the radar subsystem 808, and/or the sonar subsystem 810 may provide one or more datasets for other subsystems of the surroundings analysis system 803 for combining and/or synthesizing the data for improved segmentation.

The surroundings analysis system 803 may further include storage for simulated data that has been generated by a computer simulation algorithm, for use in part in testing. In some instances, the simulated data may include any type of simulated data, such as camera data, LIDAR data, radar data, sonar data, inertial data, GPS data, etc. In some instances, surroundings analysis system 803 can modify, transform, and/or perform the converting operations described herein on the simulated data for verifying an operation and/or for training machine learning algorithms, as described herein. For example, to test some functionality in a laboratory setting, simulated sensor data/signals might be supplied to subsystems as if it were actual sensor data, to test performance of some subsystems.

The voxel space subsystem 812 may include functionality to convert or map data to a voxel map. For example, the voxel space subsystem 812 can receive LIDAR data, camera data, radar data, sonar data, etc., and map, convert, or associate individual data points to a voxel map representing a three-dimensional space in an environment. A voxel space is a logical representation of a three-dimensional environment, such as the space surrounding an autonomous vehicle, that is represented as discrete small volumes, e.g., voxels. A voxel map provides data or values for respective voxels in the voxel space. As a representation of the three-dimensional environment, the voxel map can be stored in memory and manipulated by a processor.

In some instances, the voxel space subsystem 812 can define dimensions of a voxel space, including a length, width, and height of the voxel space. Further, the voxel space subsystem 812 may determine a size of individual voxels. In some instances, voxels may be a uniform size and shape throughout the voxel space, while in some instances, a size and/or density of voxels may vary based on a relative location in the voxel space. For example, a size of a voxel may increase or decrease in proportion to a distance of the voxel from an origin or center of the voxel space. Additionally, or in the alternative, such the voxel space subsystem 812 may comprise a transformation between a virtual origin and an origin of the voxel space. In some instances, the voxel space subsystem 812 may include functionality to generate a sparse voxel space wherein voxels that do not include data, or that include an amount of data below a data threshold, need not be present in the voxel map and the values of those voxels can be assumed or ignored. In such an instance, the voxel map may be organized as an octomap, a voxel hashing, or the like. In some instances, the voxel space subsystem 812 may include functionality to reduce an amount of noise in the data of a voxel map or the data used to generate the voxel map by filtering data as it is mapped to the voxel space and stored in the voxel map. For example, filtering may include removing data below a threshold amount of data per voxel (e.g., a number of LIDAR data points associated with a voxel) or over a predetermined number of voxels (e.g., a number of LIDAR data points associated with a number of proximate voxels). In some instances, the voxel space subsystem 812 can update a voxel map as data is gathered over time, and or in response to an autonomous vehicle navigating within the real-world environment the voxel space corresponds to. For example, the voxel space subsystem 812 may add data and/or discard data from the voxel map as an autonomous vehicle navigates in an environment.

In some instances, the voxel space subsystem 812 can initialize the voxel map, and other voxel space parameters, such as voxel size, orientation, and extent, treating the initial voxel map as representing as empty space and the voxel space subsystem 812 can build up representations of objects as LIDAR data is captured over time. In other instances, the voxel space subsystem 812 can initialize the voxel map and voxel space parameters using global map data so that locally captured LIDAR data can be used to localize the autonomous vehicle within the global map space, and can be used to clean up or clear voxels of the global map.

The ground determination subsystem 814 may include functionality to parse through individual voxels of the voxel space to determine a ground associated with the environment in the voxel space. For example, the ground determination subsystem 814 may determine a locally flat voxel by estimating a plane representative of the data associated with a particular voxel and determining a normal vector of the plane. For example, the ground determination subsystem 814 may perform a principal component analysis on the voxels of a voxel map to determine a smallest principal component associated with the data associated with the voxel. In some examples, for a principal component analysis, the smallest eigenvector may correspond to the normal vector of the plane, while an eigenvalue associated with the eigenvector may correspond to a spread or level of diffusion of the data associated with the particular voxel in the direction of the smallest eigenvector.

By way of another example, and without limitation, such a surface normal determination may be done by calculating the normal of the cross product of vectors indicating directions from a point P in a voxel, to two of P's nearest neighbors. By way of another example and without limitation, such a surface normal determination may be done by performing an eigenvalue decomposition on the covariance matrix associated with an individual voxel. In some instances, the ground determination subsystem 814 may determine whether a target voxel is a locally flat voxel by determining a surface associated with the target voxel based on values associated with neighboring voxels. Further, in some instances, the ground determination subsystem 814 may utilize a marching cubes-type algorithm to create a mesh based on average point values associated with voxels to determine triangles including at least three points to create a surface. Further, the ground determination subsystem 814 may receive a reference orientation, which may correspond to a direction or an orientation of an autonomous vehicle. The ground determination subsystem 814 may determine that a voxel is a locally flat voxel if the normal vector associated with the voxel is within a threshold amount of the reference orientation, as described above.

The clustering subsystem 816 may operate in conjunction with the ground determination subsystem 814 to determine a ground region, perhaps by growing a representation of a ground region in memory, starting with a surface that is closest to the origin of the LIDAR data, or starting with a surface that is under an autonomous vehicle. That is, voxels at positions in a voxel space that correspond to real-world positions proximate to an autonomous vehicle may be used as seed voxels by the clustering subsystem 816, which can then extend representations of voxels from those seed voxels. The clustering subsystem 816 may determine that locally flat voxels that are adjacent belong to a same cluster, and may grow a region to encompass a ground plane. Further, the clustering subsystem 816 may operate in conjunction with the object determination subsystem 820, discussed below, to determine that voxels, in a cluster or otherwise, are associated with a particular object. The clustering subsystem 816 may utilize a variety of clustering algorithms, including but not limited to region growing, hierarchical clustering, partitional clustering, square error clustering, graph theoretic clustering, mixture-resolving clustering, mean-seeking clustering, k-means clustering, N-cut clustering, proximity clustering, etc.

The interpolation subsystem 818 may operate in conjunction with the ground determination subsystem 814 and/or the clustering subsystem 816 to combine or associated various clusters together to expand a representation of a ground plane. For example, locally flat voxels may not form a single cluster when determining the ground region associated with the autonomous vehicle, in which case, the interpolation subsystem 818 may interpolate between points to determine if a gradient is above or below a threshold gradient for growing the ground plane cluster. Additional aspects of the ground determination subsystem 814, the clustering subsystem 816, and the interpolation subsystem 818 might be provided elsewhere herein as needed for understanding of those subsystems.

The object determination subsystem 820 may include functionality to determine objects represented in the voxel space by the voxel map. For example, the object determination subsystem 820 may receive an indication of the ground plane from the ground determination subsystem 814 and/or receive an indication of some or all of the locally flat voxels and may remove the voxels associated with a ground from the voxel space, so that the voxel map might only contain values for other voxels. Next, the object determination subsystem 820 may parse through the remaining voxels to determine objects based on connectivity of voxels. For example, the object determination subsystem 820 may operate in conjunction with the clustering subsystem 816 to grow regions in the voxel space corresponding to objects by determining that adjacent voxels are to be considered to be a part of a same object. The object determination subsystem 820 may assign an object identifier to all voxels associated with a particular object, and in some instances, the object identifier assigned or determined by the object determination subsystem 820 may be propagated to LIDAR data associated with voxels comprising the particular object. The additional information about objects, grounds, clusters, and the like might be stored with the voxel map or as separate data structures. Additional aspects of the object determination subsystem 820 might be provided elsewhere herein as needed for understanding of the object determination subsystem 820.

The dynamic object determination subsystem 822 may include functionality to distinguish between static objects and dynamic objects that might be determined to be present in the space corresponding to the voxel space. For example, the dynamic object determination subsystem 822 may accumulate data over time to determine motion of objects by comparing voxel values at a first time to the voxel values at a second time to determine if an occupancy of the voxel has changed over time. For example, if a voxel was occupied by an object at a first time and is not occupied by the object at a second time, the dynamic object determination subsystem 822 might deem that object to be a dynamic object and record that assessment as voxel map data. Based on which voxels are occupied or not occupied over time, the dynamic object determination subsystem 822 can determine a movement of the dynamic object, such as a speed and direction of movement. In some instances, the dynamic object determination subsystem 822 can provide an indication to determine a movement from the dynamic objects. Additional aspects of the dynamic object determination subsystem 822 might be provided elsewhere herein as needed for understanding of the dynamic object determination subsystem 822.

The ray casting subsystem 824 may operate in conjunction with the dynamic object determination subsystem 822 to distinguish between static objects and dynamic objects. Further, the ray casting subsystem 824 may include functionality to clear the voxel map over time as data accumulates in the representation of the voxel map. For example, as an object moves throughout the voxel space over time, the representation of voxels occupied by a dynamic object may involve more and more data over time. However, the ray casting subsystem 824 may analyze a path of a ray associated with LIDAR data, for example, to determine that some voxels through which the ray travels should be deemed cleared and the corresponding storage in the voxel map be cleared. Thus, the ray casting subsystem 824 may provide additional functionality to determine that voxels occupied at a first time are not occupied at a second time, which may be provided to the various subsystems to determine that objects are dynamic objects, for example. In some instances, the voxel map may be represented in a sparse manner (e.g., providing data representing occupied voxels and disregarding unoccupied voxels) or in a dense manner (e.g., without discarding voxels). In some instances, the ray casting subsystem 824 may store ray casting information in a dense manner, which is to say that voxels that don't exist in a sparse voxel representation (e.g., because voxels do not have associated LIDAR data) can have ray casting information associated with such voxels. For example, voxels without associated LIDAR data can nevertheless be represented in a dense voxel map to include ray casting information associated with the voxels of the voxel space. In some instances, the dense voxel representation may associate positive information with a voxel that a voxel is unoccupied, at least partly in response to the ray casting operations discussed herein. Further, as LIDAR data is accumulated for individual voxels, the negative information may be associated in the voxel map with individual voxels to indicate that they are occupied with a static object, for example. As data is accumulated over time, the information can be aggregated, in part, to determine whether a voxel corresponds to open space or a static object, for example. Further, the ray casting subsystem 824 may be used to clean up a global map by comparing the locally captured LIDAR data against global map data. Additional aspects of the ray casting subsystem 824 might be provided elsewhere herein as needed for understanding of the ray casting subsystem 824.

The tracking subsystem 826 may include functionality to receive an indication of one or more dynamic objects and perform additional processing in order to track the objects. For example, the tracking subsystem 826 may determine a velocity of a dynamic object and/or may determine and store a trajectory of the dynamic object over time. In some instances, the tracking subsystem 826 may be programmed to perform a prediction algorithm that may predict a path of the object to be tracked based on previous motion of the object.

The planning subsystem 828 may include functionality to receive segmented data and/or indications of the ground plane, static objects, and/or dynamic objects to determine a trajectory of an autonomous vehicle. For example, the planning subsystem 828 may receive segmentation information identifying the ground plane and may generate a trajectory for the autonomous vehicle to follow.

The sensor calibration subsystem 830 may include functionality to calibrate one or more sensors based at least in part on the segmentation information determined with respect to an environment. For example, while sensor data from the LIDAR subsystem 804, camera subsystem 806, radar subsystem 808, and/or sonar subsystem 810 may be used to estimate a location and/or orientation (e.g., using simultaneous localization and mapping (SLAM)), an autonomous vehicle may also include additional sensors, such as an inertial measurement unit (IMU) and/or a GPS unit, for determining a location of the autonomous vehicle in an environment. In some instances, the IMU may indicate that the autonomous vehicle is in a first location, while an analysis of the LIDAR data discussed herein indicates that the vehicle is in a second location different from the first location. The sensor calibration subsystem 830 may determine a difference in the locations and may adjust or calibrate one more sensors to update a location of the autonomous vehicle or one or more sensor intrinsic characteristics or extrinsic characteristics.

The annotation subsystem 832 may include functionality to receive segmentation information discussed herein and may annotate the ground plane, static objects, and/or dynamic objects with information associated with the objects, stored as data with the voxel map or otherwise. In some instances, the annotation subsystem 832 may provide segmentation information in a graphical user interface for manual verification and/or adjustment by a technician, for example. In some instances, the annotation subsystem 832 may include functionality to determine and apply a classification of the objects discussed herein. The annotation subsystem 832 may be programmed to perform machine learning algorithms, such as neural networks processes, to perform operations of segmentation and classification.

An exemplary neural network might pass input data through a series of connected layers to produce an output. One example of a neural network may include a convolutional neural network, or CNN. Each layer in a CNN may also comprise another CNN, or may comprise a number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), dimensionality reduction algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), ensemble algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The environment depicted in FIG. 8 might be implemented with one or more computer systems that comprise storage, one or more processor(s), memory, and possibly an operating system The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods might include a processor or computer system can be configured to particularly perform some or all of the methods described herein. In some instances, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some instances, the illustrated system elements could be combined into a single hardware device or separated into multiple hardware devices. If multiple hardware devices are used, the hardware devices could be physically located proximate to or remotely from each other. The examples of the methods described and illustrated are intended to be illustrative and not to be limiting. For example, some or all of the steps of the methods can be combined, rearranged, and/or omitted in different examples.

In one exemplary example, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some instances, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some instances, the processing system may use object-oriented programming and may store data in objects. In these examples, the processing system may use an object-relational mapper (ORM) to store the data objects in a relational database. The systems and methods described herein can be implemented using any number of physical data models. In one example, a relational database management system (RDBMS) can be used. In those examples, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative examples, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

The computing device may be operatively coupled to an automotive system. Such automotive system may be either manually operated, semi-autonomous, or fully autonomous. In such instances, input and output devices may include one or more image capture devices, controllers, microcontrollers, and/or other processors to control automotive functions such as, but not limited to, acceleration, braking, and steering. Further, communication infrastructure in such instances may also include a Controller Area Network (CAN) bus.

In one or more instances, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the examples described herein are not limited to one particular context and may be applicable to any application utilizing machine vision.

In one or more instances, the environment of a computer network or networks might be used. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an example, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present examples, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Instances in the present disclosure may include apparatuses for performing the operations herein. An apparatus may be specially constructed for the desired purposes, or it may comprise a general purpose device selectively activated or reconfigured by a program stored in the device.

In one or more examples, the operations described herein are embodied in machine-executable instructions. The instructions can be used to cause a processing device, for example a general-purpose or special-purpose processor, which is programmed with the instructions, to perform the steps of the present disclosure. Alternatively, the steps described herein can be performed by specific hardware components that contain hardwired logic for performing the steps, or by any combination of programmed computer components and custom hardware components. For example, a computer program product that performs the steps described here might be provided. In this environment, this can involve, for example, a machine-readable medium having instructions stored on it. The instructions can be used to program any processor or processors (or other electronic devices) to perform a process or method according to the examples herein. In addition, the instructions or the like might be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a subsystem, component, subroutine, or other unit suitable for use in a computing environment. The software can include, but is not limited to, firmware, resident software, microcode, etc. Protocols such as SOAP/HTTP may be used in implementing interfaces between programming subsystems. The components and functionality described herein may be implemented on any desktop operating system executing in a virtualized or non-virtualized environment, using any programming language suitable for software development, including, but not limited to, different versions of Microsoft Windows™, Apple™ Mac™, iOS™ Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, subsystems, and methods described herein can be implemented using any combination of software or hardware elements. The systems, subsystems, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more examples disclosed herein may be practiced with other computer system configurations, including handheld devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) described in the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of what is disclosed herein may include a particular feature, structure, or characteristic, but not every instance necessarily includes the particular feature, structure, or characteristic. Further, repeated use of the phrase "in some instances" does not necessarily refer to the same instance, although it may.

In the present description and claims, the terms "coupled" and "connected," along with their derivatives, may be used. It should be understood that these terms may be not intended as synonyms for each other. Rather, in particular usages, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments, examples and instances have been described, various alterations, additions, permutations and equivalents thereof are included within the scope of the disclosure.

In the descriptions herein, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments, instances, or examples using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

Embodiments of the disclosure can be described in view of the following clauses:

1. A method of operating an autonomous vehicle comprising: receiving, at a first time, a first primary trajectory for controlling the autonomous vehicle along a route and a first secondary trajectory for causing the autonomous vehicle to stop; receiving first message data from a subcomponent of the autonomous vehicle indicative of a status of the subcomponent at a first status time; determining, based at least in part on the first message data, a first request to control the autonomous vehicle based at least in part on the first secondary trajectory; determining, based at least in part on the first request, a vehicle trajectory state; controlling the autonomous vehicle based at least in part on the first secondary trajectory; receiving, at a second time, a second primary trajectory for controlling the autonomous vehicle along the route and a second secondary trajectory for causing the autonomous vehicle to stop; receiving second message data from the subcomponent at a second status time; determining, based at least in part on the second message data, a second request to control the autonomous vehicle based at least in part on the second primary trajectory; determining, based at least in part on the second request, to control the autonomous vehicle based at least in part on to the second secondary trajectory; controlling the autonomous vehicle based at least in part on the second secondary trajectory; receiving a release signal; and controlling the autonomous vehicle based at least in part on the second primary trajectory.

2. The method of clause 1, wherein determining the vehicle trajectory state comprises determining, as the vehicle trajectory state, an override request state indicative of selecting a contingent trajectory over a nominal trajectory: determining, based at least in part the release signal, to reset the vehicle trajectory state to a nominal request state indicative of selecting the nominal trajectory over the contingent trajectory.

3. The method of clause 2, wherein the release signal is received from a remote system configured to transmit signals in response to receiving an input from a user.

4. The method of any of clause 1 to 3, wherein determining to control the autonomous vehicle according to the first secondary trajectory comprises: performing a validity check of one or more of trajectories comprising at least the first primary trajectory or the first secondary trajectory, wherein the validity check comprises one or more of: determining whether the first primary trajectory has been generated more recently than a punctuality limit; determining whether the first primary trajectory is consistent with an immediately prior primary trajectory; or determining whether the first primary trajectory is within dynamic capabilities of the autonomous vehicle; and performing a collision check to determine whether the one or more trajectories are collision-free.

5. The method of any of clause 1 to 4, wherein controlling the autonomous vehicle based at least in part on the first secondary trajectory comprises controlling the autonomous vehicle based at least in part on one or more of: a modification of the first secondary trajectory, a previously received trajectory, a modification of the previously received trajectory, or an emergency stop trajectory.

6. The method of any of clause 1 to 5, wherein the subcomponent of the autonomous vehicle comprises one or more of a steering system, a braking system, an inverter, a traction system, a parking brake system, a motor controller, or an active suspension controller.

7. A non-transitory computer-readable storage medium having stored thereon executable instructions that, when executed by one or more processors of a computer system, cause the computer system to at least: receive a first set of instructions for controlling a vehicle; receive first message data from a component of the vehicle indicative of a status of the component; determine, based at least in part on the first message data, a first request to control the vehicle according to a first contingent set of instructions; execute, based at least in part on the first request, the first contingent set of instructions; determine a vehicle state indicative of controlling the vehicle according to the first contingent set of instructions; receive a second set of instructions for controlling the vehicle; receive second message data from the component; determine, based at least in part on the second message data, a second request to control the vehicle according the second set of instructions; determine to control the vehicle according to a second contingent set of instructions; receive a release signal; and execute the second set of instructions.

8. The non-transitory computer-readable storage medium of clause 7, wherein the first set of instructions comprises a first trajectory for controlling the vehicle along a route, and wherein the first contingent set of instructions comprises a contingent trajectory comprising one or more of: a first secondary trajectory for causing the vehicle to stop, a modification of the first secondary trajectory, a previously stored trajectory, a modification of the previously stored trajectory, or an emergency stop trajectory.

9. The non-transitory computer-readable storage medium of clause 8, wherein determining the vehicle state comprises determining, as the vehicle state, an override request state indicative of causing the computer system to use the contingent trajectory, and wherein the executable instructions, further cause the computer system to: determine, based at least in part the release signal, to reset the vehicle state to a nominal request state indicative of causing the computer system to use the second set of instructions.

10. The non-transitory computer-readable storage medium of clause 9, wherein the release signal is received from a remote system configured to transmit a signal based at least in part on an input from a user.

11. The non-transitory computer-readable storage medium of any of clause 8 to 10, wherein the executable instructions, when executed by the one or more processors, further cause the computer system to: determine a validity of one or more trajectories comprising at least the first trajectory or the contingent trajectory; and determine whether the one or more trajectories are collision-free.

12. The non-transitory computer-readable storage medium of clause 11, wherein determining the first request is further based at least in part on the validity and whether the one or more trajectories are collision-free.

13. The non-transitory computer-readable storage medium of clause 12, wherein the component of the vehicle comprises one or more of a steering system, a braking system, an inverter, a traction system, a parking brake system, a motor controller, or an active suspension controller.

14. The non-transitory computer-readable storage medium of any of clause 8 to 13, wherein the modification of the first secondary trajectory comprises increasing an amount of deceleration associated with the first secondary trajectory, and wherein the modification of the previously stored trajectory comprises increasing an amount of deceleration associated with the previously stored trajectory.

15. A system comprising: one or more processors; and non-transitory computer readable media having instructions stored thereon which, when executed by the one or more processors, cause the one or more processors to perform operations comprising: receiving a first plurality of trajectories; receiving first message data indicative of a degraded status of a component of a vehicle; determining a validity associated with a first trajectory of the first plurality of trajectories; determining, as a collision check, whether the first trajectory is collision-free; causing, based at least in part on the validity, collision check, and the first message data, the vehicle to follow a first contingent trajectory; setting a vehicle state as a contingent state; receiving a second plurality of trajectories; receiving second message data indicative of a nominal operating status of the component; causing, based at least in part on the vehicle state and the second message data, the vehicle to follow a second contingent trajectory; receiving a release signal; and controlling, based at least in part on the release signal, the vehicle to follow a second trajectory of the second plurality of trajectories, the second trajectory differing from the second contingent trajectory.

16. The system of clause 15, wherein the release signal is received from a remote system.

17. The system of clause 15 or 16, wherein the component comprises one or more of a steering system, a braking system, an inverter, a traction system, a parking brake system, a motor controller, or an active suspension controller.

18. The system of any of clause 15 to 17, wherein controlling the vehicle to follow the second trajectory is further based at least in part on determining whether a velocity of the vehicle is less than or equal to a threshold velocity.

19. The system of any of clause 15 to 18, wherein the operations further comprise setting the vehicle state to a nominal request state.

20. The system of any of clause 15 to 19, wherein determining the validity comprises one or more of: determining whether the first trajectory has been generated more recently than a punctuality limit; determining whether the first trajectory is consistent with an immediately prior trajectory; or determining whether the first trajectory is within dynamic capabilities of the vehicle.

What is claimed is:
1. A method of operating an autonomous vehicle comprising:
    receiving, at a first time, a first primary trajectory for controlling the autonomous vehicle along a route and a first secondary trajectory for causing the autonomous vehicle to stop;
    receiving first message data from a subcomponent of the autonomous vehicle indicative of a status of the subcomponent at a first status time;
    determining, based at least in part on the first message data, a first request to control the autonomous vehicle based at least in part on the first secondary trajectory;
    determining, based at least in part on the first request, a vehicle trajectory state;
    controlling the autonomous vehicle based at least in part on the first secondary trajectory;
    receiving, at a second time, a second primary trajectory for controlling the autonomous vehicle along the route and a second secondary trajectory for causing the autonomous vehicle to stop;
    receiving second message data from the subcomponent at a second status time;
    determining, based at least in part on the second message data, a second request to control the autonomous vehicle based at least in part on the second primary trajectory;
    determining, based at least in part on the second request, to control the autonomous vehicle based at least in part on to the second secondary trajectory;
    transmitting, to a remote system, the second message data and the vehicle trajectory state;
    receiving, from the remote system and based at least in part on the second message data, a release signal;
    determining, after receiving the release signal, whether to reset the vehicle trajectory state to a different level; and
    controlling the autonomous vehicle based at least in part on the vehicle trajectory state, wherein the vehicle trajectory state is indicative of whether the second primary trajectory or the second secondary trajectory is applied.

2. The method of claim 1, wherein determining the vehicle trajectory state comprises determining, as the vehicle trajectory state, an override request state indicative of selecting a contingent trajectory over a nominal trajectory:
determining, based at least in part the release signal, to reset the vehicle trajectory state to a nominal request state indicative of selecting the nominal trajectory over the contingent trajectory.

3. The method of claim 2, wherein the release signal is received from the remote system configured to transmit signals in response to receiving an input from a user.

4. The method of claim 1, wherein determining to control the autonomous vehicle according to the first secondary trajectory comprises:
performing a validity check of one or more of trajectories comprising at least the first primary trajectory or the first secondary trajectory, wherein the validity check comprises one or more of:
determining whether the first primary trajectory has been generated more recently than a punctuality limit;
determining whether the first primary trajectory is consistent with an immediately prior primary trajectory; or
determining whether the first primary trajectory is within dynamic capabilities of the autonomous vehicle; and
performing a collision check to determine whether the one or more trajectories are collision-free.

5. The method of claim 1, wherein controlling the autonomous vehicle based at least in part on the first secondary trajectory comprises controlling the autonomous vehicle based at least in part on one or more of:
a modification of the first secondary trajectory,
a previously received trajectory,
a modification of the previously received trajectory, or
an emergency stop trajectory.

6. The method of claim 1, wherein the subcomponent of the autonomous vehicle comprises one or more of a steering system, a braking system, an inverter, a traction system, a parking brake system, a motor controller, or an active suspension controller.

7. A non-transitory computer-readable storage medium having stored thereon executable instructions that, when executed by one or more processors of a computer system, cause the computer system to at least:
receive a first set of instructions for controlling a vehicle;
receive first message data from a component of the vehicle indicative of a status of the component;
determine, based at least in part on the first message data, a first request to control the vehicle according to a first contingent set of instructions;
execute, based at least in part on the first request, the first contingent set of instructions;
determine a vehicle state indicative of controlling the vehicle according to the first contingent set of instructions;
receive a second set of instructions for controlling the vehicle;
receive second message data from the component;
determine, based at least in part on the second message data, a second request to control the vehicle according the second set of instructions;
determine to control the vehicle according to a second contingent set of instructions;
transmit, to a remote system, the second message data;
receive, from the remote system, a release signal, wherein the release signal provides an indication whether to reset the vehicle state to a different level; and
execute the second set of instructions based on the level of the vehicle state.

8. The non-transitory computer-readable storage medium of claim 7, wherein the first set of instructions comprises a first trajectory for controlling the vehicle along a route, and wherein the first contingent set of instructions comprises a contingent trajectory comprising one or more of:
a first secondary trajectory for causing the vehicle to stop,
a modification of the first secondary trajectory,
a previously stored trajectory,
a modification of the previously stored trajectory, or
an emergency stop trajectory.

9. The non-transitory computer-readable storage medium of claim 8, wherein determining the vehicle state comprises determining, as the vehicle state, an override request state indicative of causing the computer system to use the contingent trajectory, and
wherein the executable instructions, further cause the computer system to:
determine, based at least in part the release signal, to reset the vehicle state to a nominal request state indicative of causing the computer system to use the second set of instructions.

10. The non-transitory computer-readable storage medium of claim 9, wherein the release signal is received from the remote system configured to transmit a signal based at least in part on an input from a user.

11. The non-transitory computer-readable storage medium of claim 8, wherein the executable instructions, when executed by the one or more processors, further cause the computer system to:
determine a validity of one or more trajectories comprising at least the first trajectory or the contingent trajectory; and
determine whether the one or more trajectories are collision-free.

12. The non-transitory computer-readable storage medium of claim 11, wherein determining the first request is further based at least in part on the validity and whether the one or more trajectories are collision-free.

13. The non-transitory computer-readable storage medium of claim 12, wherein the component of the vehicle comprises one or more of a steering system, a braking system, an inverter, a traction system, a parking brake system, a motor controller, or an active suspension controller.

14. The non-transitory computer-readable storage medium of claim 8,
wherein the modification of the first secondary trajectory comprises increasing an amount of deceleration associated with the first secondary trajectory, and
wherein the modification of the previously stored trajectory comprises increasing an amount of deceleration associated with the previously stored trajectory.

15. A system comprising:
one or more processors; and
non-transitory computer readable media having instructions stored thereon which, when executed by the one or more processors, cause the one or more processors to perform operations comprising:

receiving a first plurality of trajectories;
receiving first message data indicative of a degraded status of a component of a vehicle;
determining a validity associated with a first trajectory of the first plurality of trajectories;
determining, as a collision check, whether the first trajectory is collision-free;
causing, based at least in part on the validity, collision check, and the first message data, the vehicle to follow a first contingent trajectory;
setting a vehicle state as a contingent state;
receiving a second plurality of trajectories;
receiving second message data indicative of a nominal operating status of the component;
causing, based at least in part on the vehicle state and the second message data, the vehicle to follow a second contingent trajectory;
receiving a release signal indicative of whether the vehicle state is to be adjusted; and
controlling, based at least in part on the vehicle state, the vehicle to follow a second trajectory of the second plurality of trajectories, the second trajectory differing from the second contingent trajectory.

16. The system of claim 15, wherein the release signal is received from a remote system.

17. The system of claim 15, wherein the component comprises one or more of a steering system, a braking system, an inverter, a traction system, a parking brake system, a motor controller, or an active suspension controller.

18. The system of claim 15, wherein controlling the vehicle to follow the second trajectory is further based at least in part on determining whether a velocity of the vehicle is less than or equal to a threshold velocity.

19. The system of claim 15, wherein the operations further comprise setting the vehicle state to a nominal request state.

20. The system of claim 15, wherein determining the validity comprises one or more of:
  determining whether the first trajectory has been generated more recently than a punctuality limit;
  determining whether the first trajectory is consistent with an immediately prior trajectory; or
  determining whether the first trajectory is within dynamic capabilities of the vehicle.

* * * * *